United States Patent
Fuseya

(10) Patent No.: US 7,609,083 B2
(45) Date of Patent: Oct. 27, 2009

(54) SEMICONDUCTOR INTEGRATED CIRCUIT DEVICE AND STORAGE APPARATUS HAVING THE SAME

(75) Inventor: Tomokatsu Fuseya, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/010,596

(22) Filed: Jan. 28, 2008

(65) Prior Publication Data

US 2009/0066361 A1     Mar. 12, 2009

(30) Foreign Application Priority Data

Sep. 7, 2007     (JP)     ............................. 2007-233103

(51) Int. Cl.
*H03K 19/003* (2006.01)
*H03K 19/00* (2006.01)

(52) U.S. Cl. .......................................... 326/10; 326/16

(58) Field of Classification Search .................. 326/10, 326/16
See application file for complete search history.

(56) References Cited

U.S. PATENT DOCUMENTS 5,655,069 A * 8/1997 Ogawara et al. .............. 714/10

FOREIGN PATENT DOCUMENTS

JP     2001-177058     12/1999

* cited by examiner

*Primary Examiner*—James H. Cho
*Assistant Examiner*—Thienvu V Tran
(74) *Attorney, Agent, or Firm*—Stites & Harbison PLLC; Juan Carlos A. Marquez, Esq.

(57) ABSTRACT

A semiconductor integrated circuit device includes: a first large scale integrated circuit including a plurality of first logical blocks; a programmable second large scale integrated circuit connected the first large scale integrated circuit and including a second logical block; a memory storing data for achieving the purposes of the first logical blocks; and a control unit that, when a failure is detected in any of the first logical blocks during the operation of the first large scale integrated circuit, writes the data for the faulty first logical block stored in the memory to the second logical block, and uses the second logical block in place of the faulty first logical block.

14 Claims, 18 Drawing Sheets

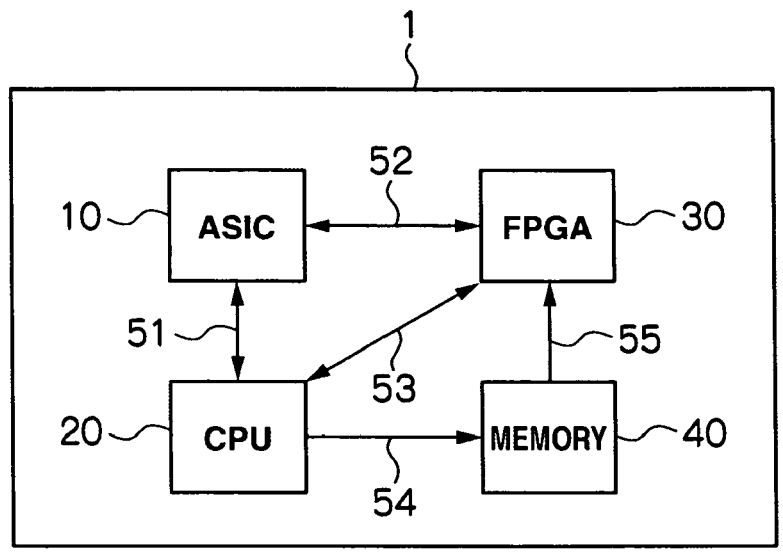
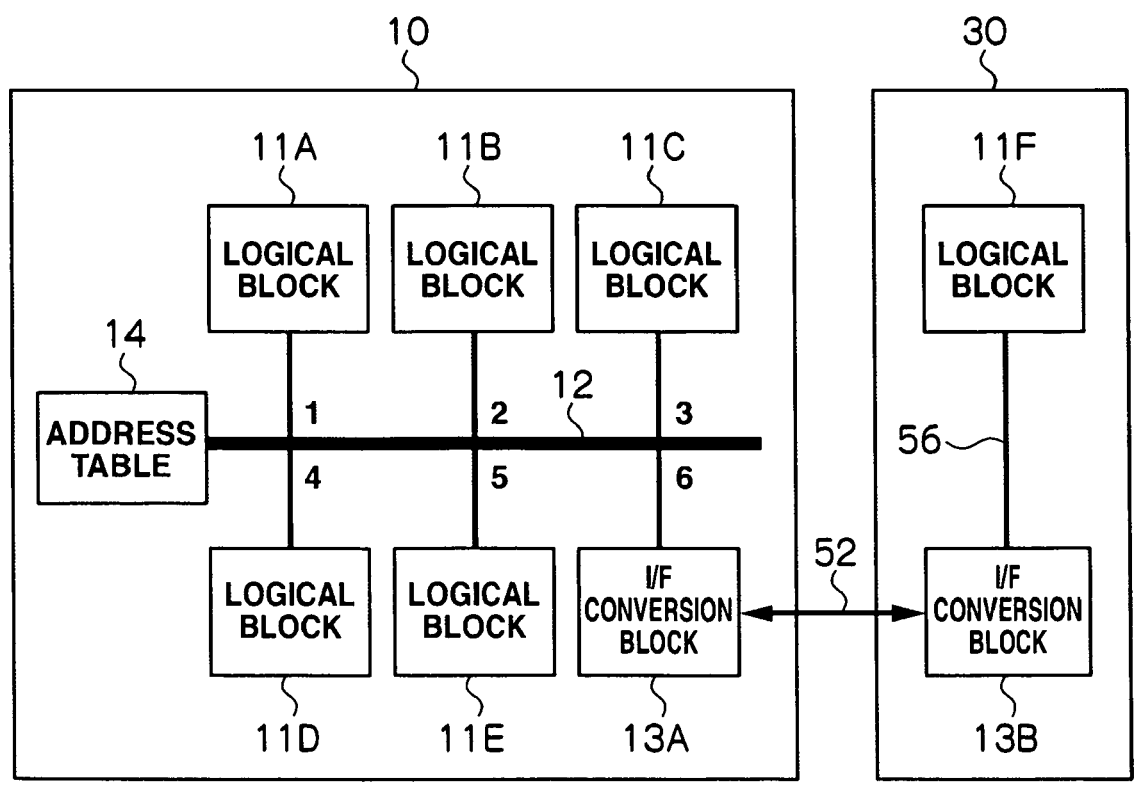

FIG.3

| ADDRESS | CONTENT |
|---|---|
| 0x00-0x07 | COMMAND |
| 0x08-0x0F | ADDRESS |
| 0x10-0x17 | DATA 1 |
| 0x18-0x1F | DATA 2 |
| ... | ... |
| ... | DATA n |

FIG.4

| BLOCK NAME | ADDRESS |
|---|---|
| LOGICAL BLOCK (11A) | 1 |
| LOGICAL BLOCK (11B) | 2 |
| LOGICAL BLOCK (11C) | 3 |
| LOGICAL BLOCK (11D) | 4 |
| LOGICAL BLOCK (11E) | 5 |

FIG.7

| TOP ADDRESS 42 | CONTENT 43 | 41 |
|---|---|
| 0x000000 | IMPLEMENTATION DATA FOR LOGICAL BLOCK 11A |
| 0x010000 | IMPLEMENTATION DATA FOR LOGICAL BLOCK 11B |
| 0x020000 | IMPLEMENTATION DATA FOR LOGICAL BLOCK 11C |
| ... | IMPLEMENTATION DATA FOR LOGICAL BLOCK 11D |
|  | IMPLEMENTATION DATA FOR LOGICAL BLOCK 11E |

FIG.8

| LOGICAL BLOCK ID 111 | TOP ADDRESS 112 | 110 |
|---|---|
| 001 | 0x000000 |
| 002 | 0x010000 |
| 003 | 0x020000 |
| ... | ... |

| BLOCK NAME | ADDRESS |
|---|---|
| LOGICAL BLOCK (11A) | 1 |
| LOGICAL BLOCK (11B) | 6 |
| LOGICAL BLOCK (11C) | 3 |
| LOGICAL BLOCK (11D) | 4 |
| LOGICAL BLOCK (11E) | 5 |

| ADDRESS | CONTENT | |
|---|---|---|
| 0x00-0x07 | COMMAND | LOGICAL BLOCK-LOGICAL BLOCK SIGNAL |
| 0x08-0x0F | ADDRESS | LOGICAL BLOCK-LOGICAL BLOCK SIGNAL |
| 0x10-0x17 | DATA 1 | LOGICAL BLOCK-LOGICAL BLOCK SIGNAL |
| 0x18-0x1F | DATA 2 | LOGICAL BLOCK-LOGICAL BLOCK SIGNAL |
| ... | ... | LOGICAL BLOCK-LOGICAL BLOCK SIGNAL |
| ... | DATA n | LOGICAL BLOCK-LOGICAL BLOCK SIGNAL |

FIG.18

| BLOCK NAME | ADDRESS |
|---|---|
| LOGICAL BLOCK (11A) | 1 |
| LOGICAL BLOCK (11B) | 2 |
| LOGICAL BLOCK (11C) | 4 |
| LOGICAL BLOCK (11C) | 5 |

FIG.19

| LOGICAL BLOCK ID | TOP ADDRESS |
|---|---|
| 001 | 0x000000 |
| 002 | 0x010000 |
| 003 | 0x020000 |
| 004 | 0x020000 |
| ... | ... |

| BLOCK NAME | ADDRESS |
|---|---|
| LOGICAL BLOCK (11A) | 1 |
| LOGICAL BLOCK (11B) | 2 |
| LOGICAL BLOCK (11C) | 3 |
| LOGICAL BLOCK (11C) | 6 |

141 142 140

FRONT SIDE

BACK SIDE

SEMICONDUCTOR INTEGRATED CIRCUIT DEVICE AND STORAGE APPARATUS HAVING THE SAME

CROSS-REFERENCES TO RELATED APPLICATIONS

This application relates to and claims priority from Japanese Patent Application No. 2007-233103, filed on Sep. 7, 2007, the entire disclosure of which is incorporated herein by reference.

BACKGROUND

1. Field of the Invention

The present invention relates to a semiconductor integrated circuit device and storage apparatus, and is particularly suitable for use in a semiconductor integrated device enabling normal device operation even when a failure occurs in a large scale integrated circuit, by using another programmable large scale integrated circuit, and a semiconductor integrated circuit device having such a semiconductor integrated circuit device.

2. Description of Related Art

With the development in semiconductor technology, manufacturing processes for semiconductor integrated circuits called LSI (Large Scale Integration circuit) or ASIC (Application Specific Integrated Circuit) have been subdivided to enhance the integration, speed, and performance of the semiconductor integrated circuits. In the case of an ASIC, once it is manufactured, no modification can be made for a change in the specifications or for a bug in the logical circuit, so the ASIC has to be reproduced using a new logical circuit. In recent years, the cost and time required for the development of ASICs have increased due to the subdivided processes, accordingly, the cost for reproducing ASICs is extremely high.

Known as a method for solving the above problem is a technique whereby the reproduction of ASICs becomes unnecessary because FPGAs (Field Programmable Gate Array) are used in combination with ASICs. With this technique, when a bug is found in one of the logical blocks in an ASIC or when it is necessary to change a logical block in accordance with a change in the specifications, the function of that logical block is implemented in the FPGA to enable a bug patch or response to the specification change without reproducing the ASIC, and this technique is disclosed in, for example, JP2001-177058 A.

There is another technique whereby a failure in an ASIC is detected by its self-test function and the faulty part is replaced with a FPGA so that the ASIC can keep on operating without being replaced.

With the conventional techniques, logical blocks that can be replaced with FPGAs are fixed. For example, where a block with a bug or a block subject to a specification change is already identified in an ASIC, the function of that block is previously implemented in a FPGA, and that block on the ASIC is not used.

Moreover, regarding a self-test function, self-test and replacement of a faulty logical block with a FPGA are performed only when an ASIC is not operating, for example, when the ASIC is powered on, so the replacement target logical block cannot be changed during operation of the ASIC.

Due to the subdivided manufacturing processes for semiconductor integrated circuits, minute dust attached to ASICs during manufacture can be the cause of a failure. Due to the subdivided manufacturing processes, the degree of integration of transistors and wires in ASICs has been raised and minute dust, which could not be a problem in the conventional processes, can cause a failure in the ASICs.

Furthermore, some failures in ASICs may be caused due to the situation where although the ASICs are operating normally in the beginning, after power being applied for a while, a short or break in the wiring in the ASICs occurs. It is difficult to detect such age deterioration as the above only by a self-test function. For example, there may be some cases where no defect was found in a self-test but was found immediately after that. In that case, the result of the self-test is normal, but in fact a failure has occurred. Age deterioration may be found by performing self-test at regular time intervals; however, in order to enhance reliability, it has to be performed more frequently. However, the ASICs cannot perform normal operation during self-test, so they have to halt normal operation to enable their self-test functions. Moreover, when they halt normal operation, they have to store required information so that they can restart normal operation after the self-test.

Accordingly, frequent performance of self-test during ASIC operation may cause performance deterioration in ASICs. For example, the ASICs arranged in storage apparatuses are mainly in charge of data transfer and, if a self-test is performed during data transfer, performance deteriorates, i.e., transfer speed slows down. Consequently, the entire performance of the storage apparatuses degrades. To the storage apparatuses, data transfer speed is very important and any slow-down of the data transfer speed is a crucial matter. Accordingly, stopping the operation of ASICs to perform self-test is not realistic.

Also, because the self-test function is not perfect, some existing failures may be missed. For example, some failures occur only when data is transferred with special timing or when a special pattern is transferred, and the self-test function cannot detect those failures.

With the conventional techniques, a failure in an ASIC sometimes cannot be detected in advance and so a semiconductor integrated circuit device having that ASIC has to be stopped temporarily to replace the ASIC with a new one.

It is an object of the invention to provide: a semiconductor integrated circuit device capable of continuing its operation even when a failure is detected in its logical block(s) during the operation of a first large scale integrated circuit; and a storage apparatus systems including that semiconductor integrated circuit device.

Note that, in the embodiments described below, an ASIC serves as a first large scale integrated circuit and a FPGA serves as a programmable second large scale integrated circuit connected to the first large scale integrated circuit. However, the invention is not limited to this case and there is nothing wrong if an ASIC is a general purpose LSI (Large Scale Integrated circuit) and a FPGA is a CPLD (Complex Programmable Logic Device).

SUMMARY

The invention provides a semiconductor integrated circuit device, including: a first large scale integrated circuit including a plurality of first logical blocks; a programmable second large scale integrated circuit connected the first large scale integrated circuit and including a second logical block; a memory storing data for achieving the purposes of the first logical blocks; and a control unit that, when a failure is detected in any of the first logical blocks during the operation of the first large scale integrated circuit, writes the data for the faulty first logical block stored in the memory to the second logical block, and uses the second logical block in place of the faulty first logical block.

The semiconductor integrated circuit device having the above configuration has high reliability because, even when a failure is detected in one of a plurality of first logical blocks during the operation of the first large scale integrated circuit, the first large scale integrated circuit does not have to stop, and so the semiconductor integrated circuit device can continue its operation.

Moreover, because the connection between the first large scale integrated circuit and the programmable second large scale integrated circuit is simplified, the number of connection pins is small, the size of the semiconductor integrated circuit device can be reduced while minimizing the effects of the number of connection pins on the chip size or package size, and so the semiconductor integrated circuit device can be manufactured at small cost.

The invention also provides a storage apparatus, including: a channel adapter board having arranged thereon a semiconductor integrated circuit device for exchanging information with an external host computer; a disk adapter board having arranged thereon a semiconductor integrated circuit device for exchanging data with an external disk; a cache board having arranged there on a semiconductor integrated circuit device for temporarily storing the information exchanged between the host computer and the disk; and a switch board having arranged thereon a semiconductor integrated circuit device for controlling the data transfer between the channel adapter board, cache board, and disk adapter board; wherein, each of the semiconductor integrated circuit devices arranged on the channel adapter board, disk adapter board, cache board, and switch board respectively includes: a first large scale integrated circuit including a plurality of first logical blocks; a programmable second large scale integrated circuit connected the first large scale integrated circuit and including a second logical block; a memory storing data for achieving the purposes of the first logical blocks; and a control unit that, when a failure is detected in any of the first logical blocks during the operation of the first large scale integrated circuit, writes the data for the faulty first logical block stored in the memory to the second logical block, and uses the second logical block in place of the faulty first logical block.

Accordingly, the storage apparatus having the above configuration has a high reliability because, even when a failure is detected in one of a plurality of first logical blocks during the operation of the first large scale integrated circuit, the first large scale integrated circuit does not have to stop, and so the storage apparatus can continue its operation.

According to the invention, it is possible to provide a semiconductor integrated circuit device capable of continuing its operation even when a failure is detected in its logical block(s) during the operation of a first large scale integrated circuit, and a storage apparatus including that semiconductor integrated circuit device.

Moreover, because the connection between the first large scale integrated circuit and the programmable second large scale integrated circuit is simplified, the number of connection pins is small, the size of the semiconductor integrated circuit device can be reduced while minimizing the effect of the chip size or package size, and so the semiconductor integrated circuit device can be manufactured at small cost.

Other aspects and advantages of the invention will be apparent from the following description and the appended claims.

BRIEF DESCRIPTION OF THE DRAWINGS

FIG. 1 shows the configuration of a circuit board according to embodiment 1 of the invention.

FIG. 2 shows the internal configuration of a first large scale integrated circuit and a second large scale integrated circuit according to embodiment 1.

FIG. 3 shows an example of pieces of packet data according to embodiment 1.

FIG. 4 shows an example of an address table according to embodiment 1.

FIG. 7 shows an example of configuration information according to embodiment 1.

FIG. 8 shows a table, according to embodiment 1, storing corresponding relationships between logical block IDs and addresses in a memory.

FIG. 18 shows an address table according to embodiment 6.

FIG. 19 shows a table, according to embodiment 7, storing correspondence relationships between the logical block IDs and the addresses in the memory.

DETAILED DESCRIPTION OF PREFERRED EMBODIMENTS

Figure 5:
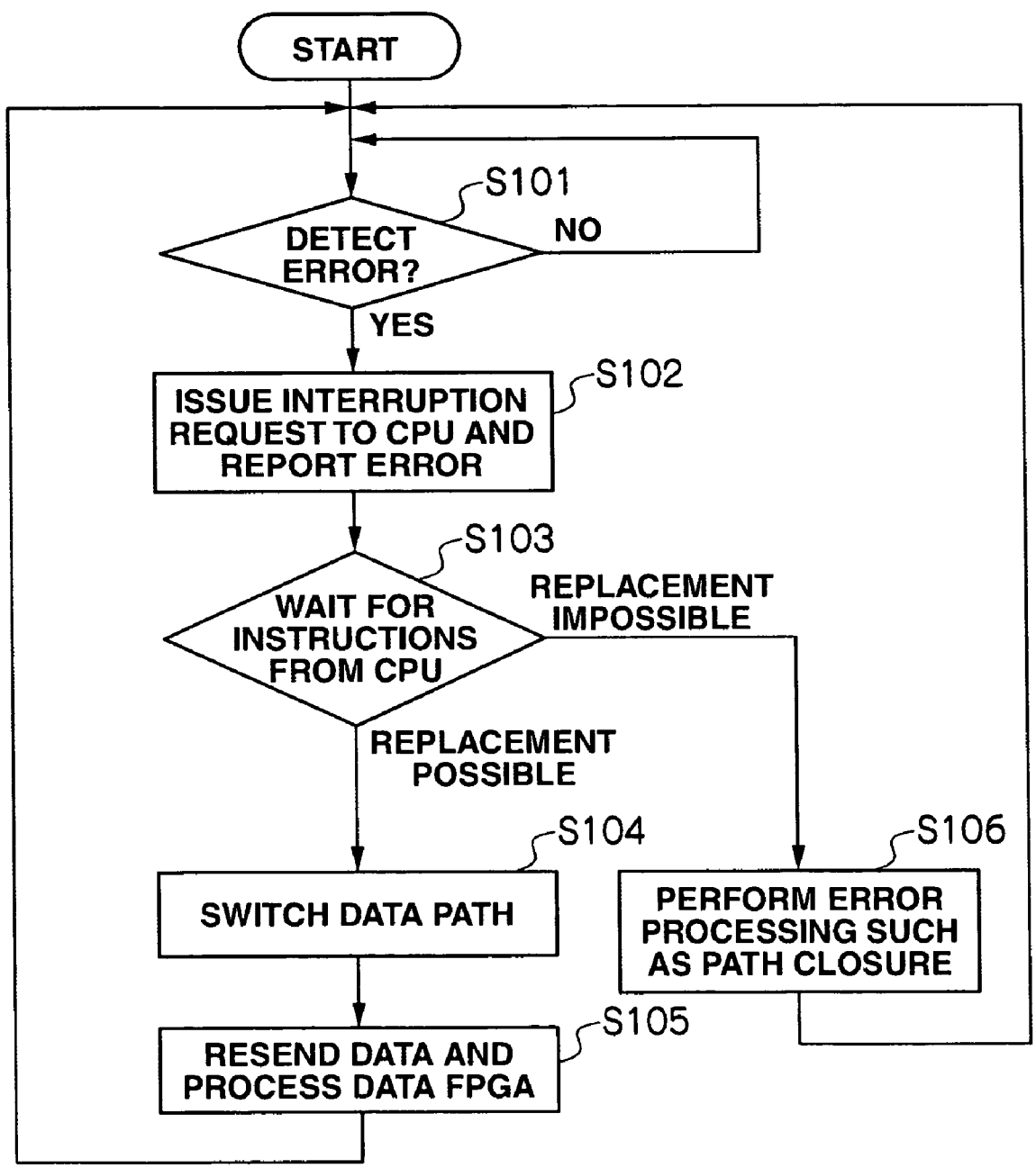
FIG. 5 is a flowchart explaining the processing according to embodiment 1, performed by a first large scale integrated circuit.

The semiconductor integrated circuit device according to the invention is capable of behaving, when a failure is detected in a logical block during the operation of an ASIC, as if there is no problem, by automatically implementing (also called installing) the function of that logical block in an FPGA. Embodiments of the invention will be explained below with reference to the drawings. Note that, in each embodiment, explanations will be given to the case where a first large scale integrated circuit arranged in a semiconductor integrated circuit is employed as an ASIC, and a programmable second large scale integrated circuit is employed as an FPGA.

Embodiment 1

FIG. 1 shows the configuration of a built-in ASIC board 1, which is a semiconductor integrated circuit device. An ASIC 10, CPU 20, FPGA 30, and memory 40 are arranged on the built-in ASIC board 1. The CPU 20 is connected to the ASIC 10 and FPGA 30 with signal lines 51 and 53 respectively, thereby enabling data exchange. The CPU 20 is also connected to the memory 40 with a signal line 54, thereby enabling data transmission to the memory 40. The memory 40 and FPGA 30 are connected to each other with a signal line 55, thereby enabling data transmission from the memory 40 to the FPGA 30. The ASIC 10 and FPGA 30 are also connected to each other with a signal line 52, thereby enabling data exchange.

The ASIC 10 is a first large scale integrated circuit and includes circuits for performing various tasks. The CPU 20 controls the ASIC 10, FPGA 30, and memory 40, thereby controlling the entire built-in ASIC board 1. The FPGA 30 is a programmable second large scale integrated circuit, in which the circuit can be reprogrammed. The memory 40 stores the configuration information (implementation data) for the FPGA 30.

Note that any type of memory such as a ROM or flash memory can be used as the memory 40, as long as it can store the configuration information for the FPGA 30. The configuration information is the information for circuits arranged on the logical blocks 11A-11E in the ASIC 10. Note that blocks are the units of design (for example, modules). By reading from the memory 40 and writing in the FPGA 30 the configuration information for a logical block found to have a failure, the FPGA 30 can serve as that faulty logical block. The configuration information stored in the memory 40 will be described later.

FIG. 2 shows the internal configurations of the ASIC 10 and FPGA 30. The ASIC 10 is composed of a plurality of logical blocks 11A, 11B, 11C, 11D, and 11E as well as an I/F conversion block 13A, and these are connected to one another with an internal bus 12.

Although FIG. 2 shows five logical blocks 11A-11E, this is merely an example simplified for ease of illustration and explanation. In recent years, as the degree of integration of semiconductor integrated circuits has risen, the number of logical blocks arranged on an ASIC has increased. An ASIC of several tens of mega-gates-class includes 100-200 logical blocks. The internal bus 12 is in charge of data transfer and is used for exchanging required information between, for example, the logical block 11A and logical block 11B. The numeric characters printed along the internal bus 12 are addresses, which are managed in an address table 14. The ASIC 10 and the FPGA 30 are connected to each other, via the I/F conversion blocks 13A and 13B, with the signal line 52. The I/F conversion blocks 13A and 13B are interfaces for converting internal-bus (12) signals and connecting the ASIC 10 and FPGA 30 to each other. Examples of signals exchanged through the internal bus 12 include the signals transmitted through an address line, data line and command line.

Signals transmitted through the internal bus 12 include data, which is divided into packets in certain units and the pieces of packet data are assigned addresses and sent in serial transmission, starting with the packet having the top address. FIG. 3 shows an example of a packet structure 100, which is the structure of packets included in signals transmitted through the internal bus 12, the packets being obtained by dividing data into certain units. As shown in FIG. 3, the packet structure 100 is composed of an address 101 and content 102. Note that the transmission method is not limited to serial transmission, so, for example, parallel transmission in byte units is also available. Further, the packing method shown in FIG. 3 is an example, and there are no limitations on the packing method.

The address table 14 will be explained below. The address table 14 stores correspondence relationships between the logical blocks and the corresponding addresses used in the internal bus 12. FIG. 4 shows an example of the address table 14. The address table 14 has a block name field 14A and address field 14B. In the block name field 14A, logical blocks 11A-11E are registered. In the address field 14B, addresses, used in the internal bus 12, of the logical blocks registered in the block name field 14A are registered.

For example, as shown in FIG. 2, because address '1' is associated with the logical block 11A, '1' is registered in a box in the address field 14B corresponding to the box of the logical block 11A in the block name field 14A.

Further, when sending data to, for example, the logical block 11B, the address of the logical block 11B—'2'—can be identified by referring to the address table 14. Accordingly, target data is sent to the address 2 in the internal bus 12. Note that the address table in FIG. 4 is merely an example, and the address table is not limited to the configuration shown in FIG. 4.

The configuration information stored in the memory 40 will be explained below. FIG. 7 shows an example of the configuration information 41. As shown in FIG. 7, the configuration information 41 consists of a plurality of pairs of top addresses 42 and content 43. The top addresses 42 are the addresses allocated to the locations in the memory 40. The content 43 is the pieces of implementation data for the logical blocks 11A-11E.

Note that, depending on the device type of the FPGA 30, the concept of page is used instead of address. In the example shown in FIG. 7, the implementation data for the logical block 11A is stored in page 1, the implementation data for the logical block 11B is stored in page 2. In other words, the implementation data for different logical blocks are stored in different pages.

As described above, the number of logical blocks arranged on the ASIC is about 100-200. Accordingly, the memory 40 has to store the implementation data for all the logical blocks. However, usually, more than one logical block having the same configuration is used, so it is not necessary to store the implementation data for all the logical blocks 100-200 and the number of pieces of implementation data that must be stored in the memory 40 may be about 30-60.

Instead of storing implementation data for all the logical blocks in the memory 40, a multi-context FPGA (not shown in the drawing) may be used. A multi-context FPGA stores a plurality of pieces of implementation data for the FPGA and switches the pieces of implementation data from one to another so that the circuit configuration of the FPGA can be switched instantly.

A table, stored in the CPU 20, storing correspondence relationships between the logical block IDs and the memory addresses will be explained below. FIG. 8 shows the table 110. The table 110 is used when searching for the address of a location in the memory 40 storing the data that should be transferred to the FPGA 30, based on the ID of a faulty logical block. The table 110 has a logical block ID field 111 and top address field 112. In the logical block ID field 111, IDs of the logical blocks 11A-11E (identifiers assigned uniquely to the logical blocks) are registered. In the top address field 112, top addresses of the locations in the memory 40 storing the pieces of implementation data for the logical blocks whose IDs are registered in the logical block ID field 111 are registered.

Figure 6:
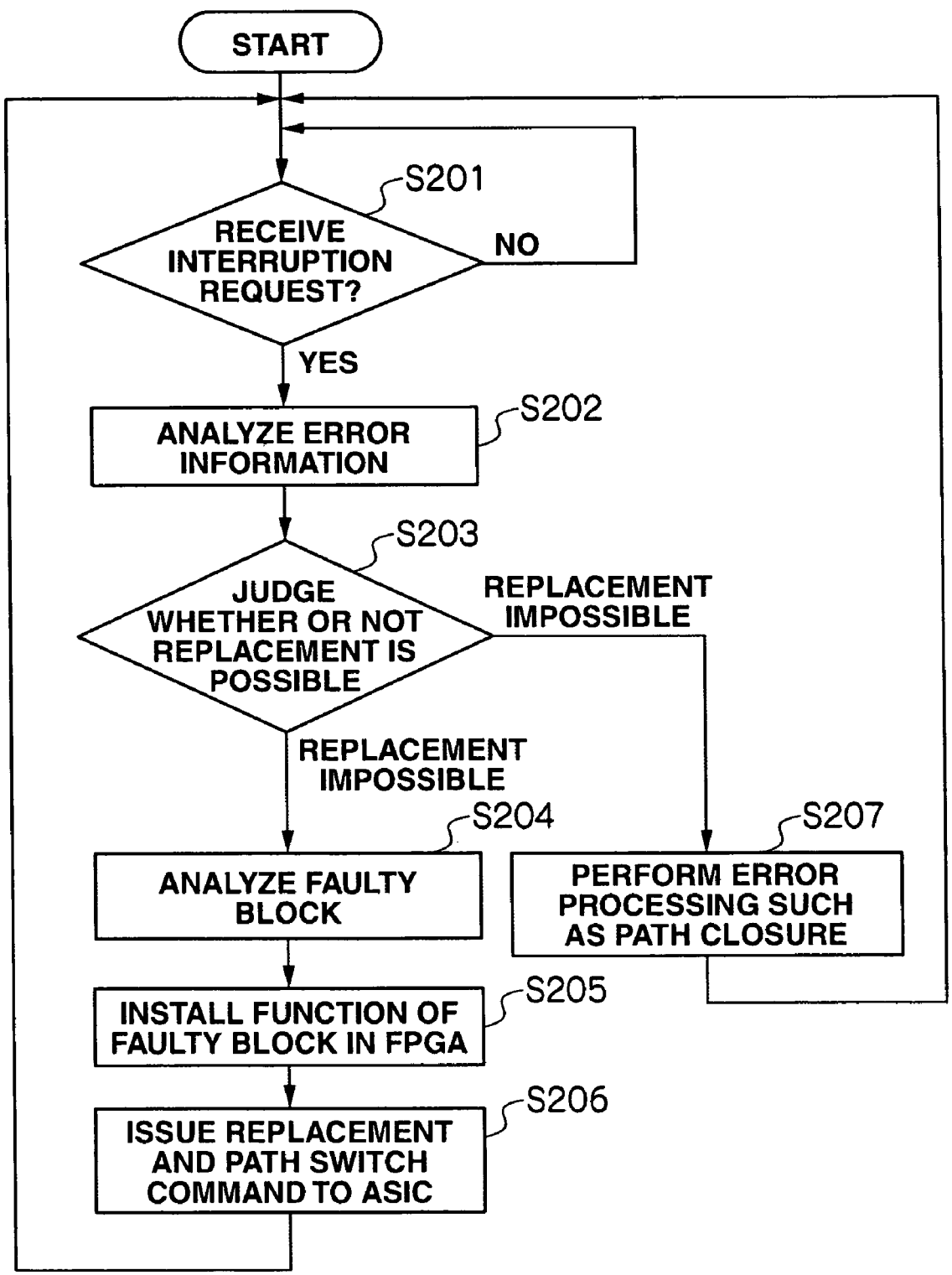
FIG. 6 is a flowchart explaining the processing according to embodiment 1, performed by a control unit.

Detection of a failure in a logical block in an ASIC 10 and replacement with the FPGA 30 will be explained below. FIG. 5 is a flowchart explaining the detection processing in the ASIC 10 and FIG. 6 is a flowchart explaining the replacement processing in the CPU 20. Note that these processes start, for example, when the built-in ASIC board 1 is arranged in a storage apparatus (also called a storage system) and starts to operate.

First, steps 101 and 102 in FIG. 5 will be explained below. In step 101, the ASIC 10 performs an error check during its normal operation. An error check is to find, for example, an error in parity attached to the data line or a timeout when waiting for response from a communication counterpart. Note that error data is appropriately handled, for example, the error data is discarded. Storage apparatuses check, in order to protect data exchanged between host systems and disks, whether or not there is an abnormality such as data corruption in various locations in the ASICs 10. Accordingly, as long as ASICs are employed in storage apparatuses, they can perform an error check during their normal operation.

The ASIC 10 performs the error check and if no error is found in any logical block (S101: NO), it continues with normal operation. Meanwhile, if an error is detected (S101: YES), it issues an interruption request to the CPU 20 through the signal line 51 and reports the error in step S102.

Having received the error report, the CPU 20 executes steps S201-207 in FIG. 6. In step S201, the CPU 20 checks whether or not it receives an interruption request. If it has received an interruption request (S201: YES), it analyzes the error information in step S202. Here, the error information may be stored in, for example, a register (not shown in the drawing) in the ASIC 10, and the CPU 20 may obtain that information by reading from the register or, in an alternative configuration, a signal line for error information may be provided in the signal line 51 so that the CPU 20 can obtain the error information through that signal line 51. In short, any method can be used for obtaining the error information. The error information includes the ID of the faulty logical block as well as the content of the failure. Examples of the failure content include a manufacture failure such as an initial failure and a failure due to age deterioration.

In step S203, the CPU 20 judges whether or not the function of the faulty logical block can be implemented in the FPGA 30 and the faulty logical block can be replaced with the FPGA 30. If the FPGA 30 has already been occupied by another faulty logical block, the current faulty logical block cannot be replaced. In that case (S203: replacement impossible), the CPU 20 handles the error, e.g., closes the relevant path in step 207. In this error handling, the CPU 20 sends a normal error handling command to the ASIC 10 but, if replacement is impossible, it sends an error handling command corresponding to that situation. An example of the case where replacement is judged impossible is when a failure has already occurred in a different logical block in the ASIC 10 and a logical block 11F in the FPGA 30 has already been used in place of that faulty logical block.

When the FPGA 30 is not occupied by another faulty logical block (S203: replacement possible), the CPU 20 finds out in step S204 which logical block in the ASIC 20 has a failure, based on the error information analyzed in step 202.

Then, in step S205, the CPU 20 implements the function of the faulty logical block in the FPGA 30.

Steps 204 and 205 will be explained below in detail. As described above, the memory 40 stores the configuration information for the logical blocks 11A-11E in the ASIC 10.

The CPU 20 sends the top address of the faulty logical block, which is identified in the table 110 when the failure is found, to the memory 40 via the signal line 54.

The CPU 20 then sends a command to the FPGA 30 through the signal line 53 to read the implementation data. The FPGA 30 then reads the data from the designated address in the memory 40 through the signal line 55 and establishes the desired circuit.

When reading of the implementation data is complete, the FPGA 30 reports the completion to the CPU 20 through the signal line 53.

Then, in step S206, the CPU 20 issues to the ASIC 10 a command to replace the faulty logical block with the FPGA 30 and switch the relevant data path in the ASIC 10. Note that after the CPU 20 issues the replacement and path switch command, it returns to step S201 and remains in a stand-by state until it receives another interruption request again.

Returning to FIG. 5, steps S103-106 will be explained below. Having received the command from the CPU 20, the ASIC 10 judges in step S103 whether or not the command from the CPU 20 is a replacement command issued in step S206 or the command for when replacement is impossible issued in step S207.

If the ASIC 10 judges that the command from the CPU 20 is a replacement command (S103: replacement possible), it performs a switch step. More specifically, it switches the relevant data path in step S104. The data path is switched by updating the address table 14 in the ASIC 10.

Figures 9, 10:
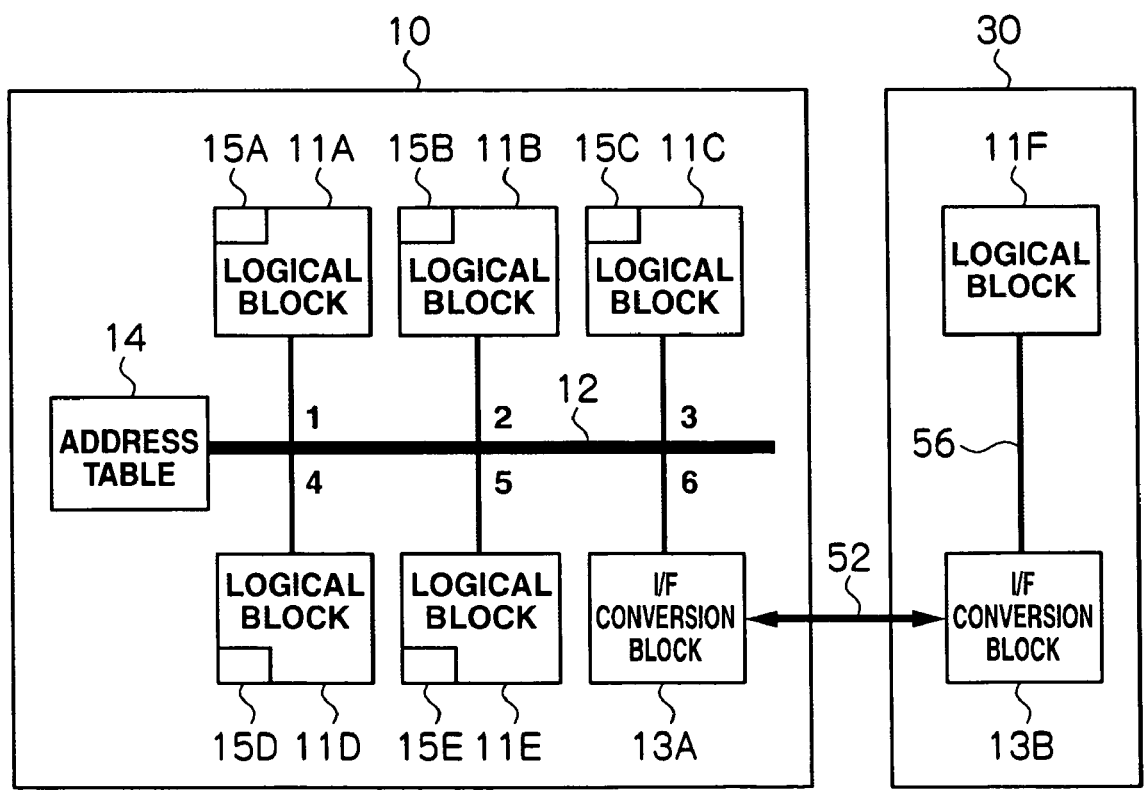
FIG. 9 shows the address table, according to embodiment 1, updated after the processing.
FIG. 10 shows the internal configuration of a first large scale integrated circuit and a second large scale integrated circuit according to embodiment 2.

FIG. 9 shows the address table 14', which is an example of the updated address table 14. In this example, the logical block 11B listed in the block name field 14'A is a faulty logical block. Therefore, the address registered in the box in the address field 14'B corresponding to the logical block 11B is updated to 6 (the address of the logical block in the FPGA 30). After the update of the address table 14, when data is transferred, for example, from the logical block 11A to the logical block 11B, the FPGA 30 is accessed via the I/F conversion block 13A because the address of the logical block 11B is now '6' as shown in the address table 14'. In other words, the faulty block 11B in the ASIC 10 is no longer used and the logical block 11F in the FPGA 30 is used instead.

Then, in step S105, the ASIC 10 resends relevant data. Here, if the internal bus 12 has a resending function, that function may be used. If the internal bus 12 does no have a resending function, the ASIC 10 sends a resend request to the sending source logical block. Incidentally, the resending function is not shown in the drawing. The resent data is sent to the logical block 11F in the FPGA 30 based on the updated address table 14', and so the faulty logical block is no longer used. By automatically performing the error detection and replacement with the FPGA 30 on the built-in ASIC board 1, even if an error occurs in the ASIC 10, the built-in ASIC board 1 can continue normal operation without paying attention to that error.

Meanwhile, if the ASIC 10 judges, based on the command from the CPU 20, that replacement is impossible (S103: replacement impossible), it handles the error in step S106. Here, an example of error handling includes closing of a relevant path so that the data path leading to the faulty logical block will not be used.

According to embodiment 1, even when a failure is detected in any of the logical blocks 11A-11E during the operation of the ASIC 10, the built-in ASIC board 1 can continue operation, thereby improving the reliability of the performance of the built-in ASIC board 1.

According to embodiment 1, it is also possible to reduce the number of signal lines connecting the ASIC 10 and FPGA 30 to each other, minimize the effects of the signal lines on the chip size in the ASIC and FPGA, and simplify the board wiring. With conventional techniques, the signal lines for the logical blocks which may be replaced with the FPGA are connected directly or via a selector to the FPGA. Although the use of a selector enables connection between a plurality of logical blocks and the FPGA, the number of signal lines connecting the ASIC and FPGA must be the same as the number of signal lines of the logical block having the largest number of signal lines. For example, because a storage apparatus requires high-speed data transfer, pieces of data in the ASIC have different bit widths, for example, 256 bit width and 512 bit width. When connection pins for sending signals for the data have a bit width like the above, the number of pins must be 256 or 512. This may be the cause of an increased chip size or package size in the ASIC. Further, because the ASIC and the FPGA are connected by 256 or 512 lines, board design is complicated and an increased number of board layers increases the cost for the board. However, according to embodiment 1, the ASIC and the FPGA are connected, via the I/F conversion blocks 13A and 13B, with the signal line 52, so the number of signal lines can be reduced.

Accordingly, because the ASIC 10 and the FPGA 30 are connected only with the signal line 52, the number of connection pins is small, the effects of the signal lines on the chip size and package size can be reduced, and the cost for manufacturing the built-in ASIC board 1 can be reduced.

Embodiment 2

Embodiment 2 of the invention will be explained below. Conventionally, data in a RAM or a flip-flop is corrupted due to irradiation of alpha rays or neutron rays, for example, a data element originally having '0' may have '1' instead. In recent years, in particular, the RAM and flip-flop are manufactured in small sizes thanks to subdivided manufacturing processes, and so the data may be corrupted even by smaller energy. This is called a soft error and, because it is not a failure in the hardware, normal operation can be continued as long as another piece of correct data is written in the RAM or flip-flop.

In embodiment 1, when a failure is detected, even when the failure is caused by a soft error, not a hard error, the failure is handled as a hard error and a faulty logical block is replaced with the logical block 11F in the FPGA 30. However, if the failure is not caused by a physical failure in the ASIC 10, it is unnecessary to use the FPGA 30 and the built-in ASIC board 1 can still continue its normal operation only with the ASIC 10. In view of this point, according to embodiment 2, by which error—soft error or hard error—a failure is caused is determined and, if it is a soft error, the ASIC 10 continues to be used without involving the FPGA 30.

FIG. 10 shows the configurations of the ASIC 10 and FPGA 30 according to embodiment 2. Only the differences from embodiment 1 will be explained below and shown in the drawing. What is different from embodiment 1 is that the logical blocks 11A-11E in the ASIC 10 each have their own respective self-test (also called self-diagnosis) circuits 15A-15E. The self-test circuit 15A has the function of performing a self-test for the logical block 11A and determines whether or not the logical block 11A has a physical failure. The same goes for the self-test circuits 15B-15E.

Figure 11:
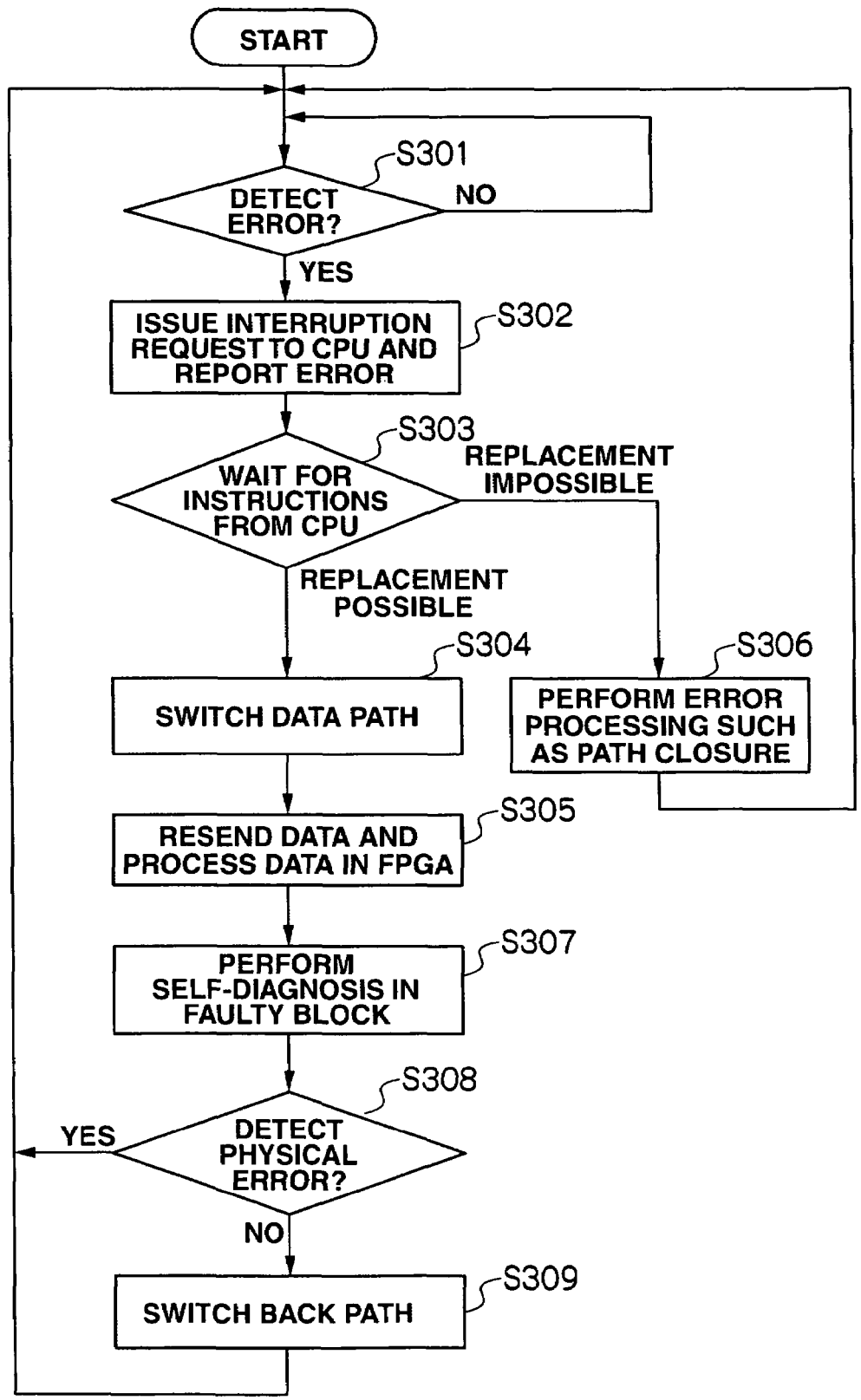
FIG. 11 is a flowchart explaining the processing according to embodiment 2, performed by the first large scale integrated circuit.
Figure 12:
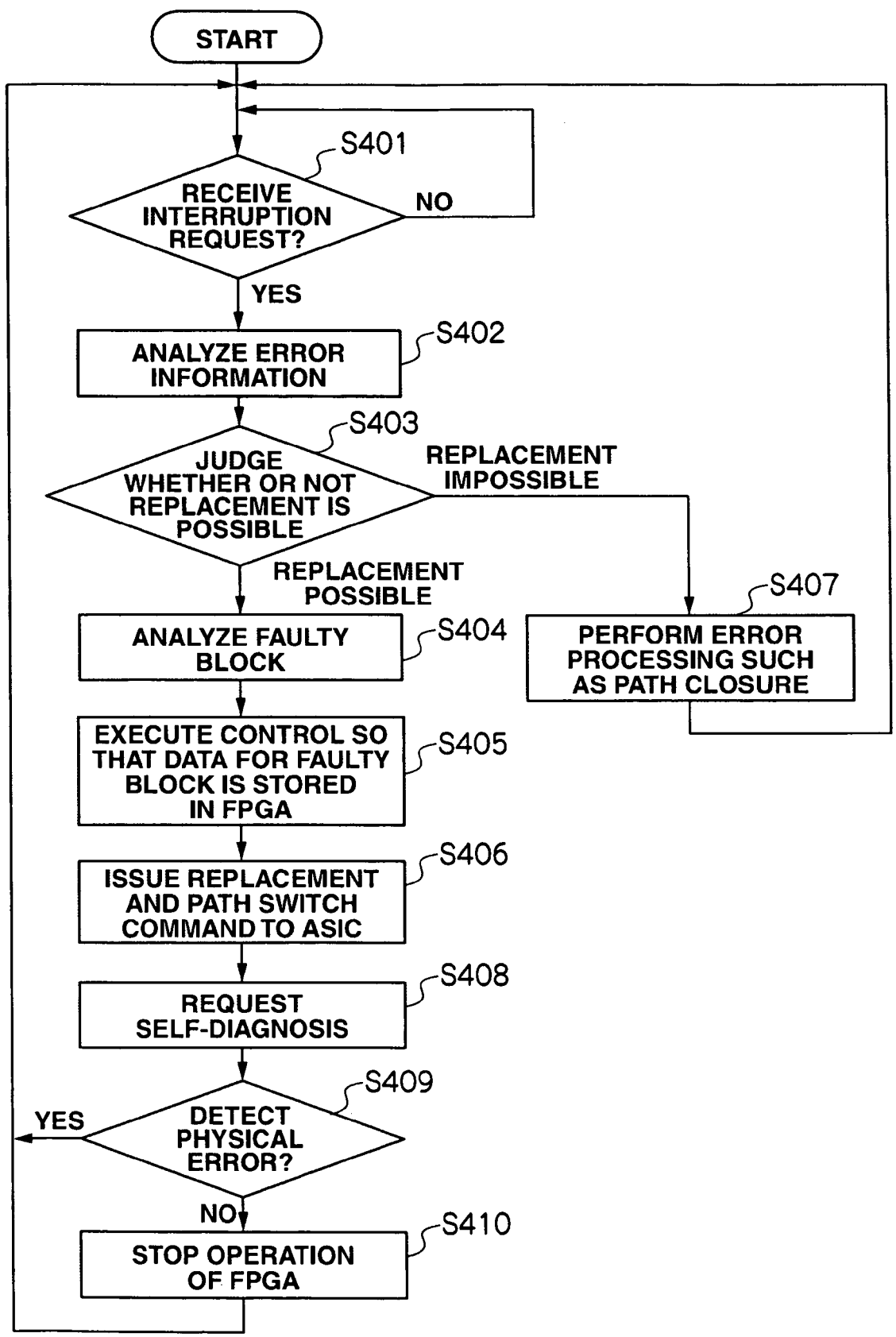
FIG. 12 is a flowchart explaining the processing according to embodiment 2, performed by the control unit.

Detection of a failure in a logical block in the ASIC 10 and replacement with the FPGA 30 according to embodiment 2 will be explained below. FIG. 11 is a flowchart explaining the detection processing in the ASIC 10 and FIG. 12 is a flowchart explaining the replacement processing in the CPU 20. Note that, because steps S301-306 in FIG. 11 are the same as steps S101-106 and steps S401-407 in FIG. 12 are the same as steps S201-207, explanations for them are omitted and only additional steps will be explained below.

In FIG. 12, after step S406, the CPU 20 issues a command to the ASIC 10 to conduct self-test in step S408.

Having received the command, the ASIC 10 conducts self-test of a faulty logical block by means of a relevant self-test circuit 15A-15E in step 307. Here, although the ASIC 10 is operating normally, the faulty logical block has already been replaced by the logical block 11F in the FPGA 30, so the faulty logical block in the ASIC 10 is not in use. This means there is no problem in performing self-test in that faulty logical block even during the operation of the ASIC 10. Whether the failure is a soft error or hard error is determined by this self-test.

In step S308, the ASIC 10 determines, based on the result of the self-test, whether or not a physical failure has been detected. If the failure is a soft error, the ASIC 10 determines that there is no physical failure, whereas if the failure is a hard error, it determines that there is a physical failure. If a physical failure is detected (S308: YES), it means the failure is a hard error, so the ASIC 10 continues using the logical block 11F in the FPGA 30. In this case, the determination by the CPU 20 in step 409 as to whether or not a physical failure has been detected results in 'YES,' and the logical block 11F in the FPGA 30 continues to be used.

Meanwhile, if no physical failure is found in the self-test (S308: NO), it means the failure is a soft error so, in step S309, the ASIC 10 stops using the logical block 11F in the FPGA 30 and adopts the previous configuration where it uses its own faulty logical block.

More specifically, the ASIC 10 switches back the data path it switched in step S304 so that the faulty logical block is used, not the logical block 11F in the FPGA 30. In this case, the determination by the CPU 20 in step S409 results in NO and, in step S410, the CPU 20 stops the operation of the FPGA 30 because it is unnecessary now.

Although, in embodiment 2, whether or not a failure is caused by a soft error is determined by self-test, there are some hard errors that cannot be found by self-test. A failure that occurs when data is transferred with a special timing or when a special pattern is transferred, cannot be found in self-test.

Accordingly, it is preferable for the CPU 20 to count the number of times each logical block 11A-11E in the ASIC 10 has a failure so that, when the count exceeds a predetermined limit, a faulty logical block is replaced with the logical block 11F in the FPGA 30 even if a physical error is not found during self-test. Alternatively, another configuration may employed where the ASIC 10 has no self-test circuit 15A-15E and whether to keep on using the logical block 11F in the FPGA 30 or return to the previous configuration using a faulty logical block in ASIC 10 is decided depending on the number of times a failure occurs.

According to embodiment 2, each logical block 11A-11E has a self-test circuit 15A-15E so that they can determine whether a failure is a hardware error or a software error. If it is a hardware error, the logical block 11F in the FPGA 30 is used in place of the faulty logical block. Meanwhile, if it is a software error, appropriate control is executed so that the faulty logical block can be used again, consequently, the logical block 11F in the FPGA 30 can be used efficiently.

Embodiment 3

Embodiment 3 of the invention will be explained below. The configurations in embodiments 1 and 2 include the I/F conversion blocks 13A and 13B; however, the configuration in embodiment 3 has no I/F conversion block 13A or 13B. Only the differences from embodiments 1 and 2 will be explained below and shown in the drawing.

Figure 13:
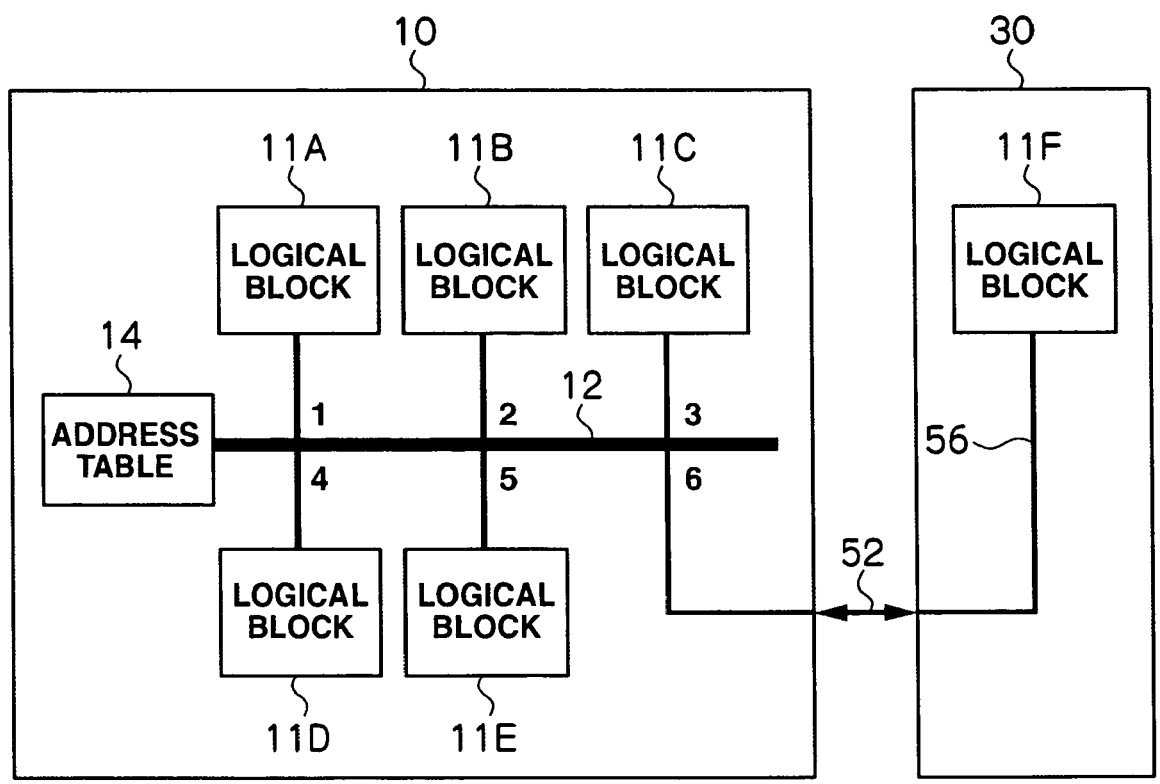
FIG. 13 shows the connection according to embodiment 3, between the first large scale integrated circuit and the second large scale integrated circuit.

FIG. 13 shows the configurations of the ASIC 10 and FPGA 30 in embodiment 3. The internal bus 12 in the ASIC 10 is directly connected to the logical block 11F in the FPGA 30. The processing performed by the ASIC 10 and CPU 20 is the same as that in embodiments 1 and 2. Note that the self-test circuits 15A-15E used in embodiment 2 are not shown in FIG. 13.

According to embodiment 3, unlike in embodiments 1 and 2, it is not necessary to provide the I/F conversion blocks 13A and 13B, so it is possible to obtain a built-in ASIC board 1 where the ASIC 10 and the FPGA 30 are easily connected.

Embodiment 4

Embodiment 4 of the invention will be explained below. In embodiments 1-3, the logical blocks 11A-11E in the ASIC 10 are connected to one another with the internal bus 12 as shown in FIG. 2. Although the logical blocks 11A-11E are connected only to the internal bus 12, they may also be connected to one another with signal lines. For example, regarding an error detection signal, it takes time to send one through the internal bus 12, so it is preferable to send it directly from a logical block to a logical block. In embodiment 4, there are interfaces connecting the logical blocks to one another other than the internal bus 12. Only the differences from embodiments 1-3 will be explained below and shown in the drawing.

Figure 14:
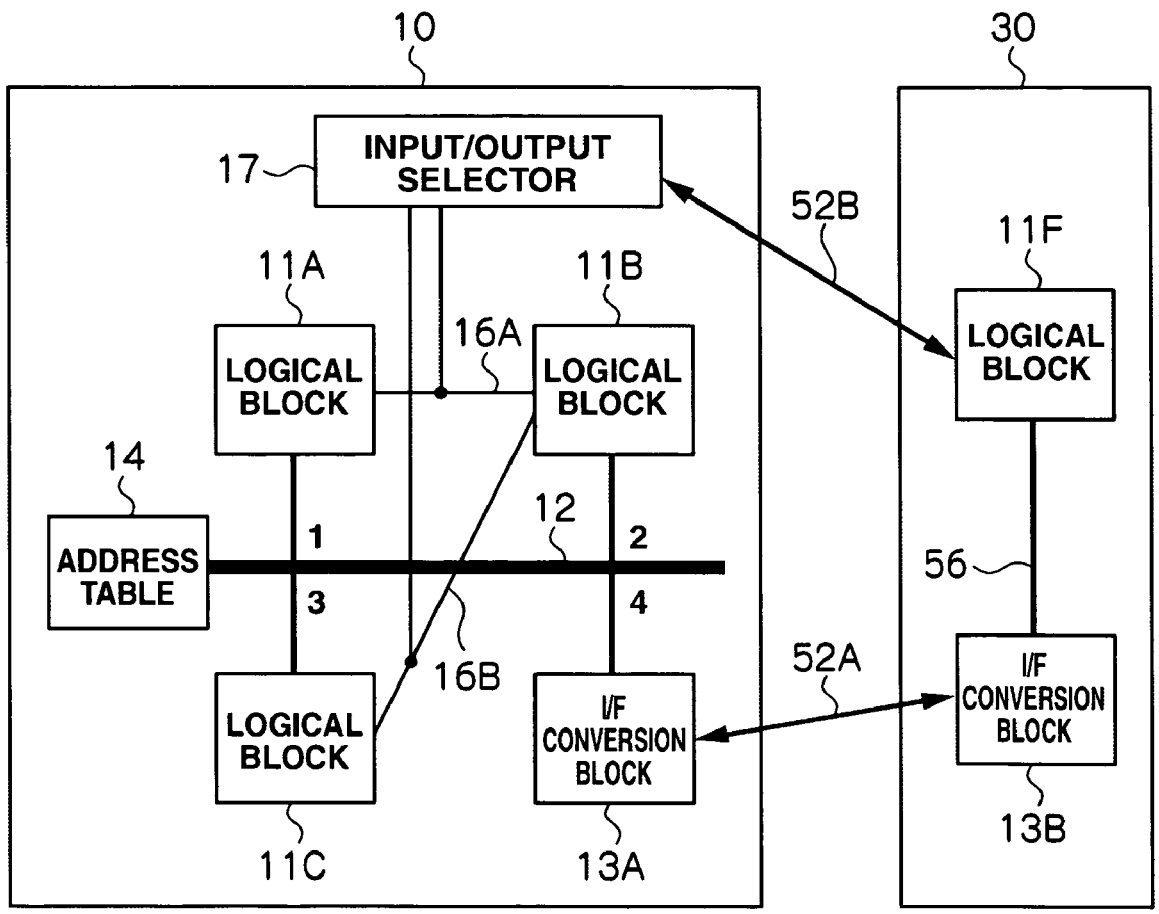
FIG. 14 shows the connection according to embodiment 4, between the first large scale integrated circuit and the second large scale integrated circuit.

FIG. 14 shows the configurations of the ASIC 10 and FPGA 30 in embodiment 4. As shown in FIG. 14, the ASIC 10 includes, in addition to the internal bus 12, signal lines 16A and 16B connecting the logical blocks to one another. Note that, for ease of explanation, only a limited number of logical blocks in the ASIC 10 are shown in FIG. 14.

The signal line 16A connects the logical blocks 11A and 11B to each other and the signal line 16B connects the logical blocks 11B and 11C to each other. Here, the signal lines connected to the internal bus 12 are connected to the FPGA 30 via the I/F conversion block 13A, and the rest of the signal lines 16A and 16B are connected to the FPGA 30 via an input/output selector 17.

For example, the case where the function of the logical block 11B is implemented in the FPGA 30 and replaced by the logical block 11F in the FPGA 30 will be explained below. Here, when the logical block 11A intends to access the logical block 11B through the internal bus 12, it has to access the logical block 11F in the FPGA 30 via the internal bus 12, I/F conversion block 13A, the signal line 52A, and the I/F conversion block 13B. Meanwhile, when the logical block 11A intends to directly access the logical block 11B, it only has to access the logical block 11F in the FPGA 30 via the input/output selector 17 and signal line 52B. The same path may be used when the logical block 11F in the FPGA 30 accesses any of the logical blocks 11A-11C in the ASIC 10.

According to embodiment 4, it is possible to provide a built-in ASIC board 1 that is compatible with signals other than those passing through the internal bus 12.

Embodiment 5

Embodiment 5 of the invention will be explained below. embodiment 5 is a modification of embodiment 4. Only the differences from embodiments 1-3 will be explained below and shown in the drawing.

Figures 15, 16:
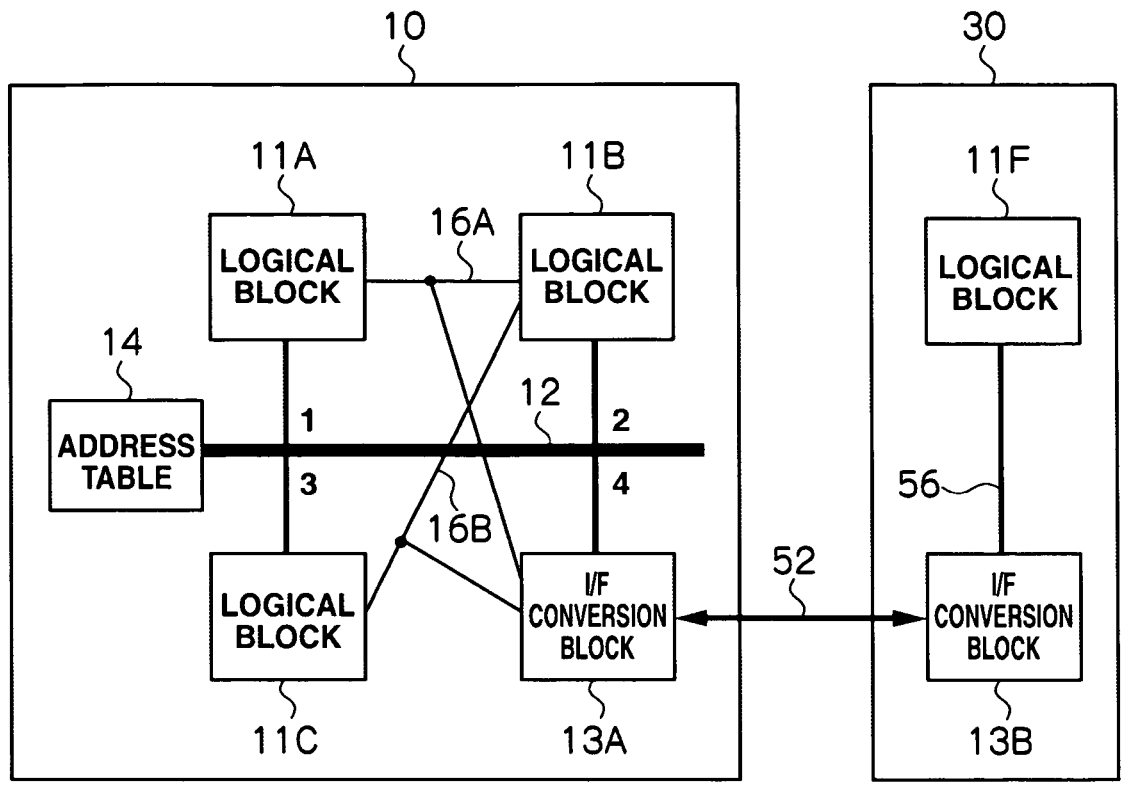
FIG. 15 shows the connection according to embodiment 5, between the first large scale integrated circuit and the second large scale integrated circuit.
FIG. 16 shows an example of pieces of transmitted data according to embodiment 5.

FIG. 15 shows the connection between the ASIC 10 and FPGA 30 in embodiment 5. As shown in FIG. 15, in embodiment 5, the signal lines between the logical blocks are connected to the FPGA 30 via the I/F conversion block 13A. An example of the packet structure handled by the I/F conversion block 13A according to embodiment 5 will be explained below. FIG. 16 shows an example of the packet structure. In the packet structure 100 in FIG. 3, addresses are registered in the address field 101 and pieces of data in a command are registered in the content field 102, with each packet being 8 bytes long composed of an address and a piece of data. Meanwhile, in the packet structure 150 in embodiment 5, as shown in FIG. 16, addresses are registered in the address field 151, and the pieces of data in a command as well as the logical block-logical block signals are registered in the content field 152, with each packet being composed of an address, a piece of data, and a logical block-logical block signal, an address and a piece of data being 7 bytes long and a logical block-logical block signal being 1 byte long. Note that, for convenience of illustration, the size of data for a logical block-logical block signal is large.

Many of the signals transmitted between the logical blocks require instant sending, for example, error detection signals. Accordingly, a 1-byte logical block-logical block signal is included in each 8-byte packet so that the packet can be transmitted as soon as possible.

Although not shown in FIG. 16, it is not always necessary to include a logical block-logical block signal in every 8-byte packet, but, for example, a 1-byte logical block-logical block signal may be inserted between 8-byte pieces of command/address data. Moreover, regarding a signal for which immediacy is not required, it may be only necessary to add a logical block-to-logical block signal at the front or the end of a packet.

Thus, according to embodiment 5, it is possible to provide a built-in ASIC board 1 compatible with signals other than those passing through the internal bus 12.

Embodiment 6

Embodiment 6 of the invention will be explained below.

Figure 17:
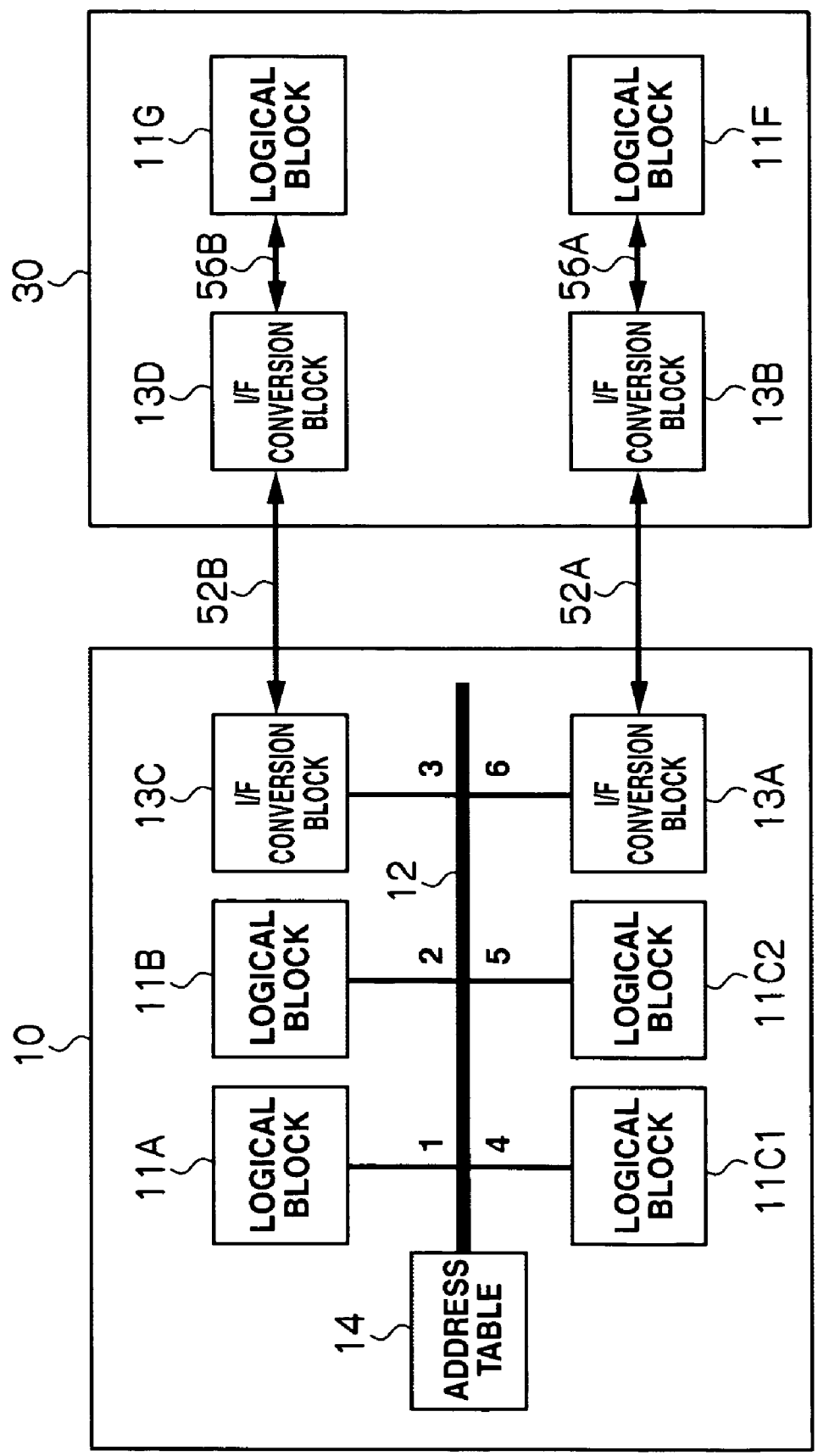
FIG. 17 shows the connection according to embodiment 6, between the first large scale integrated circuit and the second large scale integrated circuit.

FIG. 17 shows the connection between the ASIC 10 and FPGA 30 in embodiment 6. Only what is different from embodiment 1 will be explained below and shown in the drawing.

As shown in FIG. 17, two logical blocks 11C are arranged on the ASIC 10. In order to distinguish between them, one is sometimes referred to as a logical block 11C1 and the other as a logical block 11C2. In order to enhance reliability, the same processing is performed by the two logical blocks 11C1 and 11C2 and, only when their results match, both logical blocks 11C1 and 11C2 are judged normal and, when the results are different, either of the logical blocks 11C1 and 11C2 is judged abnormal. The ASIC 10 includes an additional I/F conversion block 13C. For ease of explanation, a smaller number of logical blocks than that in embodiment 1 are shown. On the FPGA 30, the I/F conversion blocks 13B and 13D and the logical blocks 11F and 11G are arranged. The I/F conversion block 13B and the logical block 11F are connected to each other with a signal line 56A, and the I/F conversion block 13D and the logical block 11G are connected to each other with a signal line 56B. Furthermore, the I/F conversion block 13A and the I/F conversion block 13B are connected to each other with a signal line 52A and the I/F conversion block 13C and the I/F conversion block 13D are connected to each other with a signal line 52B.

The addresses, used in the internal bus 12, of the logical blocks 11A, 11B, 11C1 and 11C2 and the I/F conversion blocks 13A and 13C are '1,' '2,' '4,' '5,' '6,' and '3,' respectively.

In the case of this configuration, when the results of the processing by the logical blocks 11C reveals that one of the logical blocks has a failure, that faulty block cannot be identified. Accordingly, in embodiment 6, the functions of both logical blocks 11C1 and 11C2 are implemented in the FPGA 30 and replaced. Because two logical blocks are provided, the ASIC 10 has two I/F conversion blocks 13A and 13C. Likewise, the FPGA 30 includes two I/F conversion blocks 13B and 13D as well as two logical blocks 11F and 11G so that the functions of the two logical blocks 11C1 and 11C2 can be implemented therein.

An address table 120 and a table 130 in a CPU, both according to embodiment 6, will be explained below. FIG. 18 shows the address table 120 in embodiment 6. The address table 120 has a block name field 121 and address field 122. Logical block names are registered in the block name field 121 and their addresses are registered in the address field 122, in the same manner as described in relation to the address table 14. In embodiment 6, because there are two logical blocks 11C, both of them are registered in the block name field 121 and their addresses '4' and '5' are registered in the address field 122.

FIG. 19 shows the table 130 in embodiment 6, showing correspondence relationships between the logical block IDs and memory addresses. The table 130 includes a logical block ID field 131 and top address field 132. Because the logical blocks 11C each execute the same processing, the same top address is registered in the boxes in the top address field 132 corresponding to their IDs '003' and '004' registered in the logical block ID field 131, so that the same implementation data is read from the memory 40.

Figure 20:
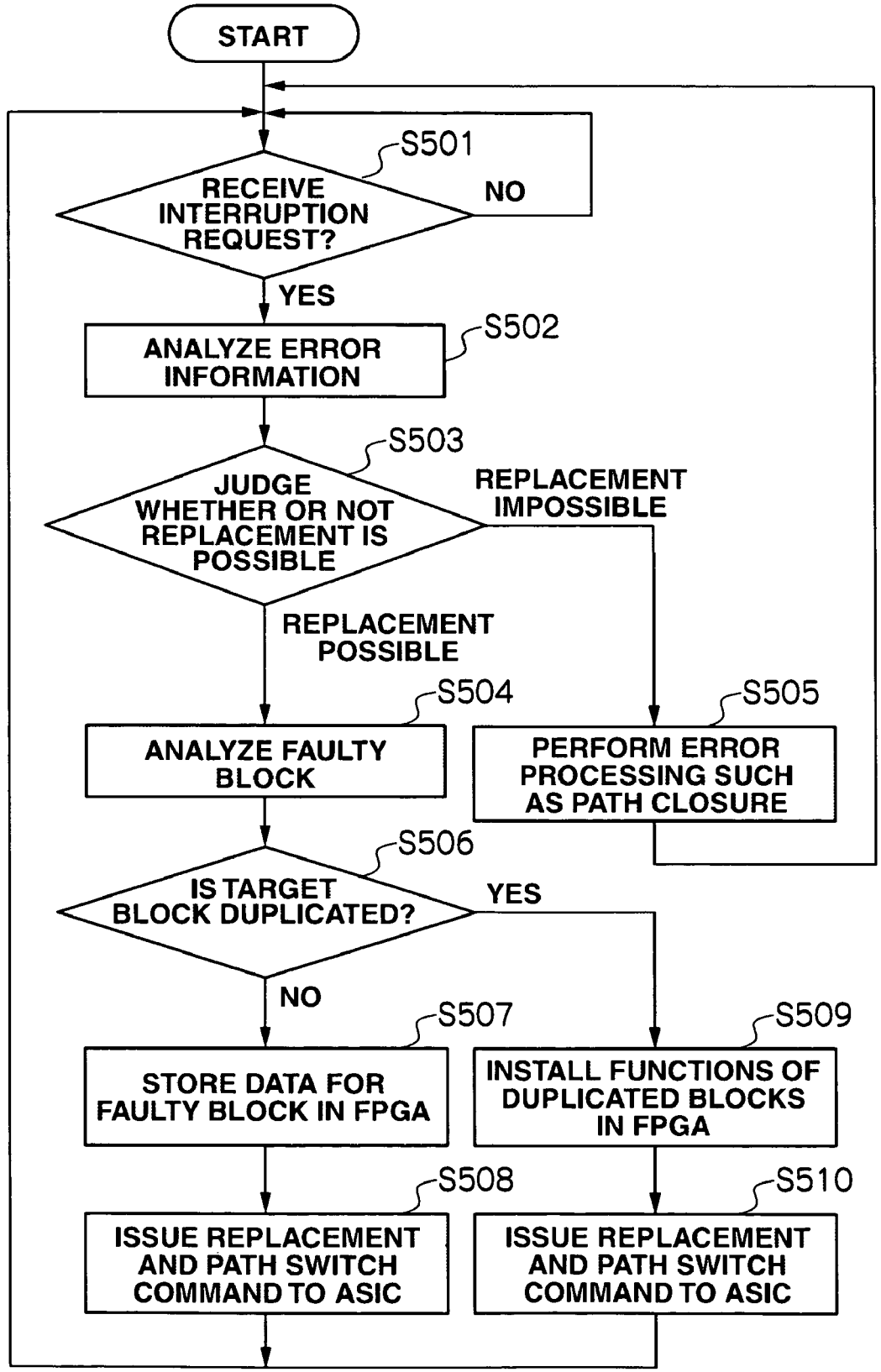
FIG. 20 is a flowchart according to embodiment 7, explaining the processing performed by the control unit.

The replacement of the logical blocks 11C1 and 11C2 will be explained below. FIG. 20 is a flowchart explaining the replacement processing performed by the CPU 20. Steps S501-S505 are the same as steps S201-S204 and S207 explained in relation to FIG. 6, so explanations will be omitted and only steps S506-S510 will be explained below. The steps performed by the ASIC 10 for the replacement are the same as those in FIG. 5 so they will not be explained or shown in the drawing.

After the analysis of a faulty block in step S504, the CPU 20 judges in step S506 whether or not a target block is duplicated. In other words, it judges whether or not a faulty logical block is duplicated. This judgment is made based on the information for the duplicated logical blocks, stored in the CPU 20. Note that the information is previously stored in the CPU 20.

If the CPU 20 judges that the target block is not duplicated (S506: NO), it sends the data for the faulty block to the FPGA 30 in step S507, and issues a replacement and path switch command to the ASIC 10 in step S508. The replacement and path switching steps are the same as steps 205 and S206.

Meanwhile, if the CP 20 judges that the target block is duplicated (S506: YES), it implements the functions of the duplicated blocks in the FPGA 30 in step S509. More specifically, it writes the implementation data for the duplicated logical blocks stored in the memory 40 to the logical blocks 11F and 11G in the FPGA 30. Here, the CPU 20 refers to the table 130 and stores, in the logical blocks 11F and 11G in the FPGA 30, the implementation data it has read from the top addresses registered corresponding to the IDs of the duplicated logical blocks. Pieces of the data for the duplicated logical blocks are collectively stored in the memory 40 and they will be stored in the logical blocks 11F and 11G in the FPGA 30.

Then, in step S510, the CPU 20 issues a replacement and path switch command to the ASIC.

Figures 21, 22:
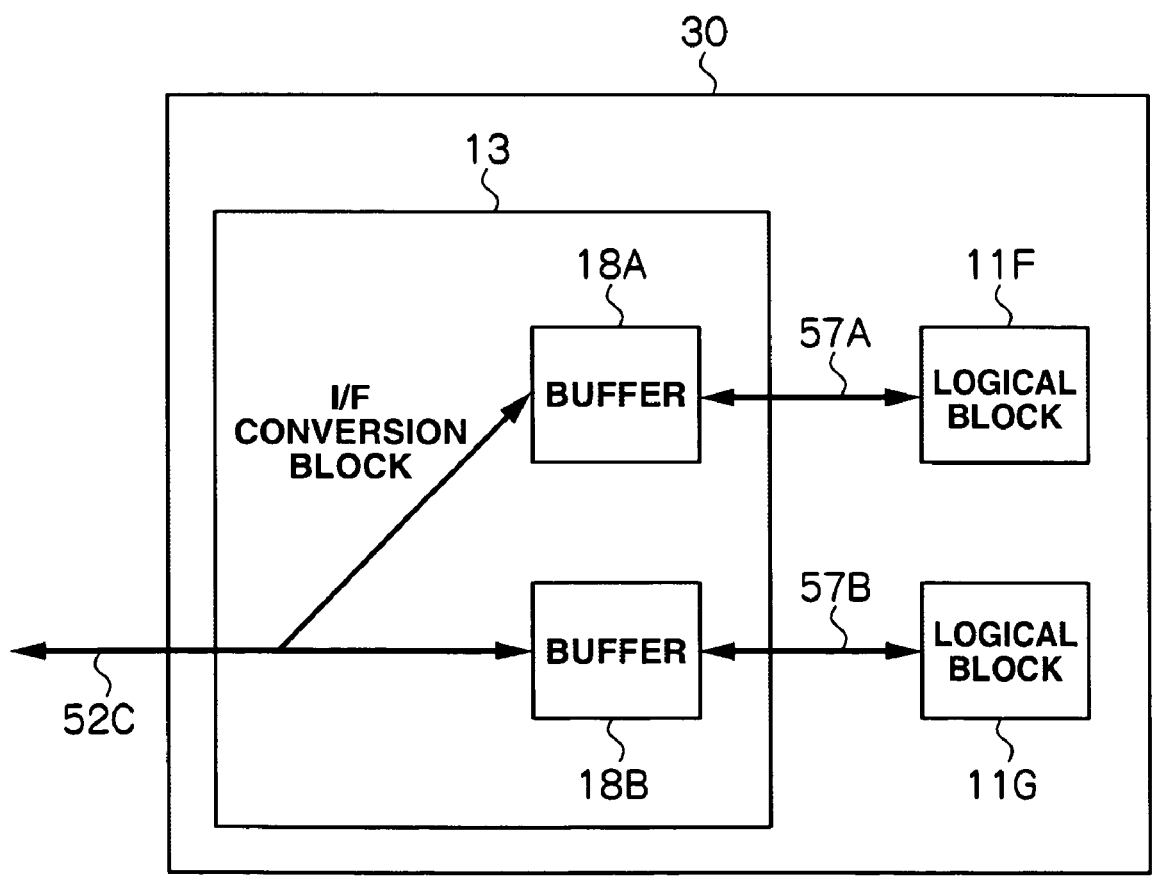
FIG. 21 shows the address table, according to embodiment 7, updated after the processing.
FIG. 22 shows the configuration of the second large scale integrated circuit according to embodiment 7.

FIG. 21 shows the address table 140 updated after replacement in the case where the faulty block is duplicated (i.e., where either of the logical blocks 11C1 and 11C2 has a failure). The addresses registered in the boxes in the address field 142 corresponding to the two logical blocks 11C registered in the block name field 141 are now '3' and '6.' In other words, although the addresses of the logical blocks 11C1 and 11C2 in the previous address table 120 were '4' and '5,' now they are updated to '3' and '6.' Accordingly, hereafter, in the built-in ASIC board 1, the logical blocks 11F and 11G are used in place of the logical blocks 11C1 and 11C2.

According to embodiment 6, the invention can be applied in a built-in ASIC board 1 having a configuration for enhancing data reliability.

Note that if the FPGA 30 does not have enough space for arranging two logical blocks 11C1 and 11C2, two FPGAs 30 may be provided so that the functions of the logical blocks 11C1 and 11C2 can be implemented separately in the two FPGAs 30.

Embodiment 7

Embodiment 7 of the invention will be explained below. FIG. 22 shows the connection in the FPGA 30 in embodiment 7. Only what is different from embodiment 1 will be explained below and shown in the drawing.

In embodiment 7, the I/F conversion block 13 includes two buffers 18A and 18B. Also, the FPGA 30 includes two logical blocks 11F and 11G. The logical block 11F and the buffer 18A are connected to each other with a signal line 57A and the logical block 11G and the buffer 18B are connected to each other with a signal line 57B. The FPGA 30 is configured so that the two logical blocks 11F and 11G are used alternately so that two commands are processed in parallel. Although embodiment 7 is explained for the case where two logical blocks 11F and 11G are provided, three or more logical blocks may be provided.

Parallel processing using two logical blocks alternately will be explained below. First, data sent through the signal line 52C is stored in the buffer 18A in the I/F conversion block 13. The data the buffer 18A receives is processed in the logical block 11F. When other data arrives at the I/F conversion block 13, that data is stored in the buffer 18B. The data the buffer 18B receives is processed in the logical block 11G.

When the processing for the first data, i.e., the data being processed in the logical block 11F, is complete, the content of the processing performed in the logical block 11F is reported to the buffer 18A. The content reported to the buffer 18A is further reported to the ASIC 10 via the I/F conversion block 13.

When still more data arrives at the I/F conversion block 13, it is stored in the buffer 18A and processed in the logical block 11F. When the processing for the data in the logical block 11G is complete, the content of the processing performed in the logical block 11G is reported to the buffer 18B. Then, the content reported to the buffer 18B is further reported to the ASIC 10 via the I/F conversion block 13.

According to embodiment 7, when a plurality of pieces of data are sent from the ASIC 10 to the FPGA 30, these pieces of data can be processed in parallel, so high-speed processing is achieved in the built-in ASIC board 1.

Also, according to embodiment 7, the invention can be applied to a built-in ASIC board 1 having a configuration for parallel processing of data.

Embodiment 8

Figure 23:
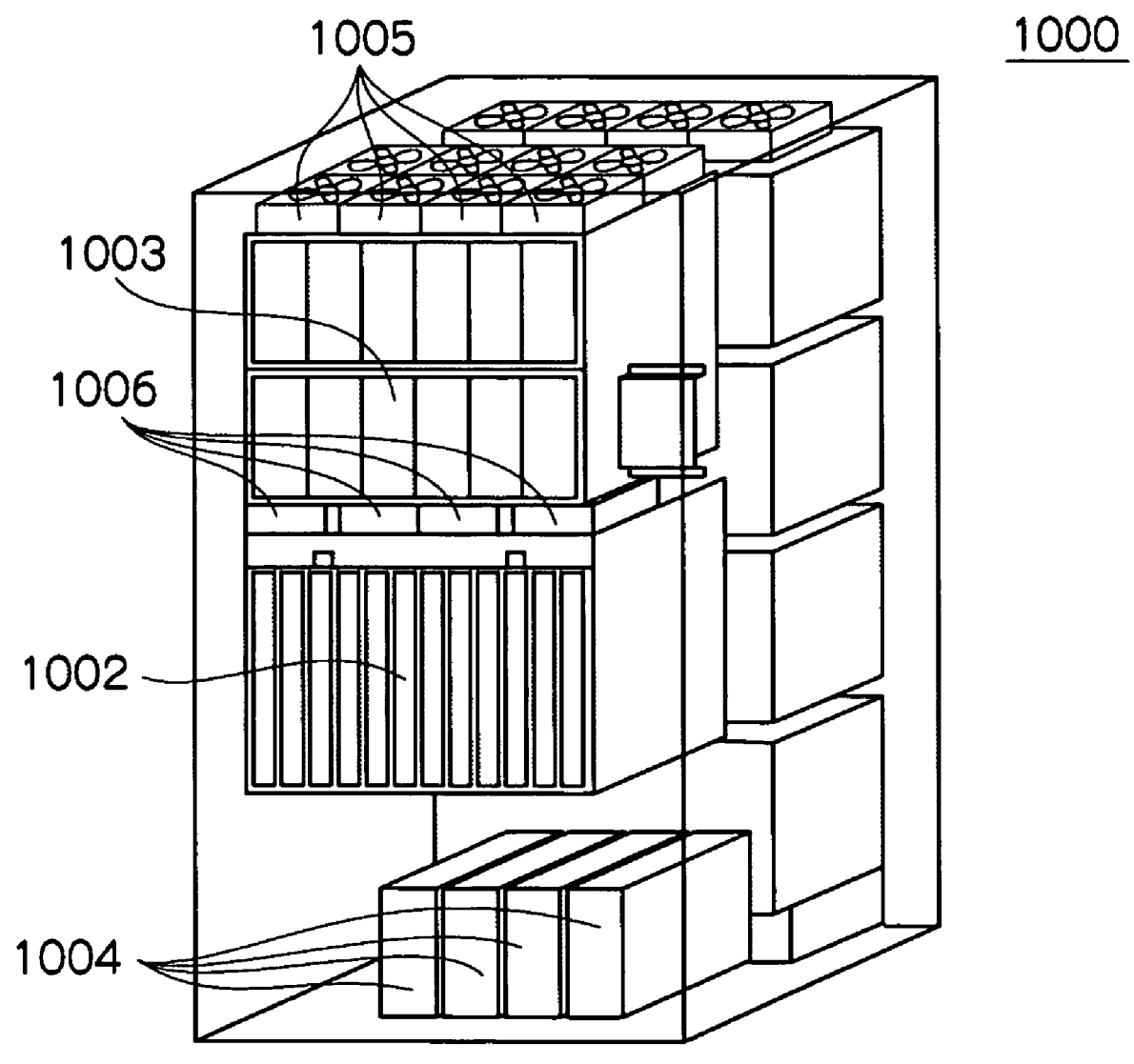
FIG. 23 shows the internal configuration of a storage apparatus according to embodiment 8, seen from the front side.
Figure 24:
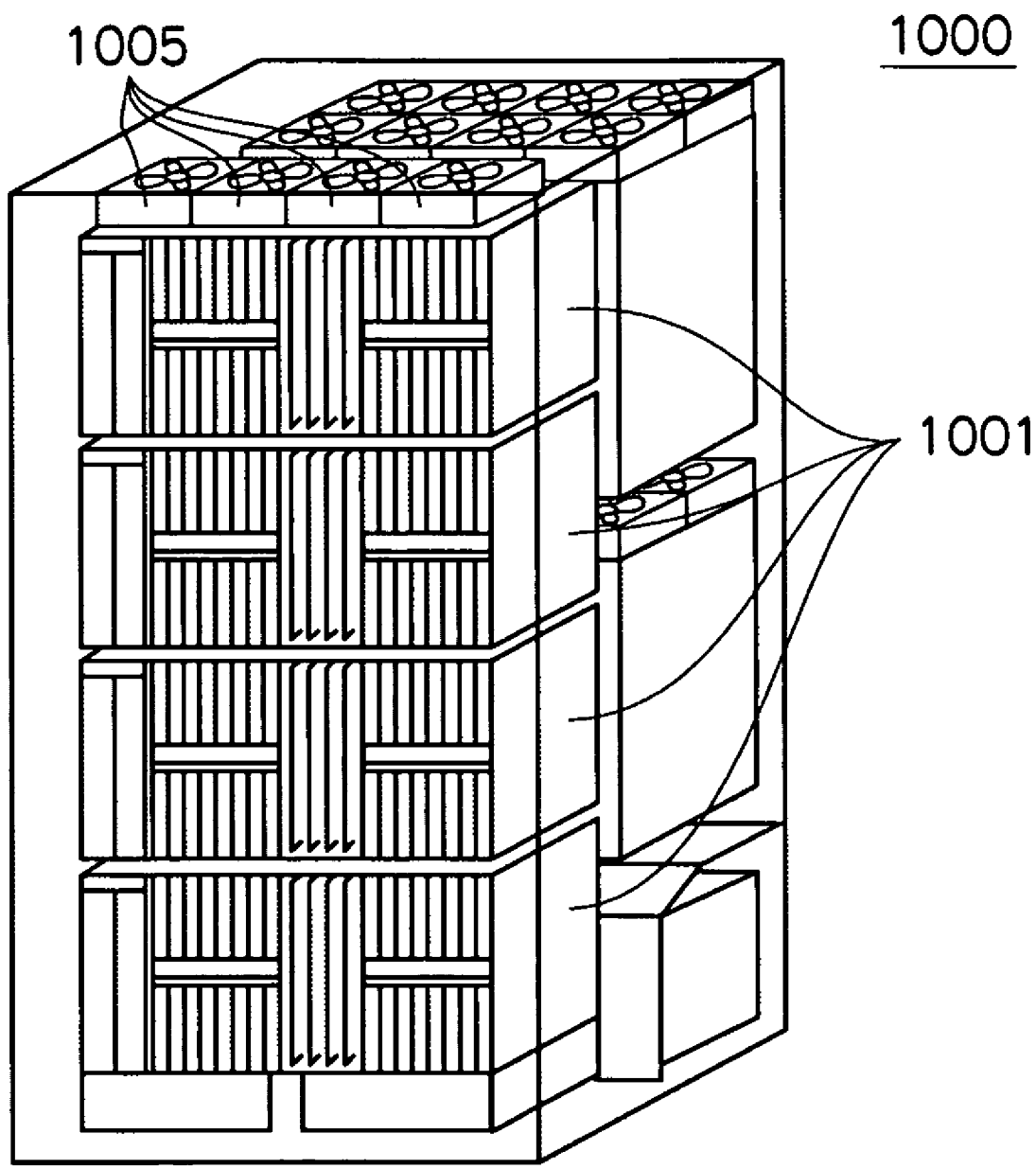
FIG. 24 shows the internal configuration of the storage apparatus according to embodiment 8, seen from the back side.

The above-described built-in ASIC board 1 according to each embodiment can be applied in a storage apparatus. FIGS. 23 and 24 show the major configuration of a storage apparatus 1000. FIG. 23 shows the internal configuration of the storage apparatus 1000, seen from the front side and FIG. 24 shows the internal configuration seen from the back side.

The storage apparatus 1000 has HDD (Hard Disc Drive) boxes 1001, logical unit 1002, power source section 1003, batteries 1004, fans 1005 and 1006.

A plurality of HDDs are arranged in each HDD box 1001. A plurality of boards having conductive components (including built-in ASIC boards 1) are arranged in the logical unit 1002 to control the data transfer between the host systems and the HDDs in the HDD boxes 1001. Regarding the boards arranged in the logical unit 1002, they may be different in type according to functions or they may be the boards having the same function so that redundancy is provided. The power source section 1003 and batteries 1004 supply power to the HDD boxes 1001 and logical unit 1002.

Figure 25:
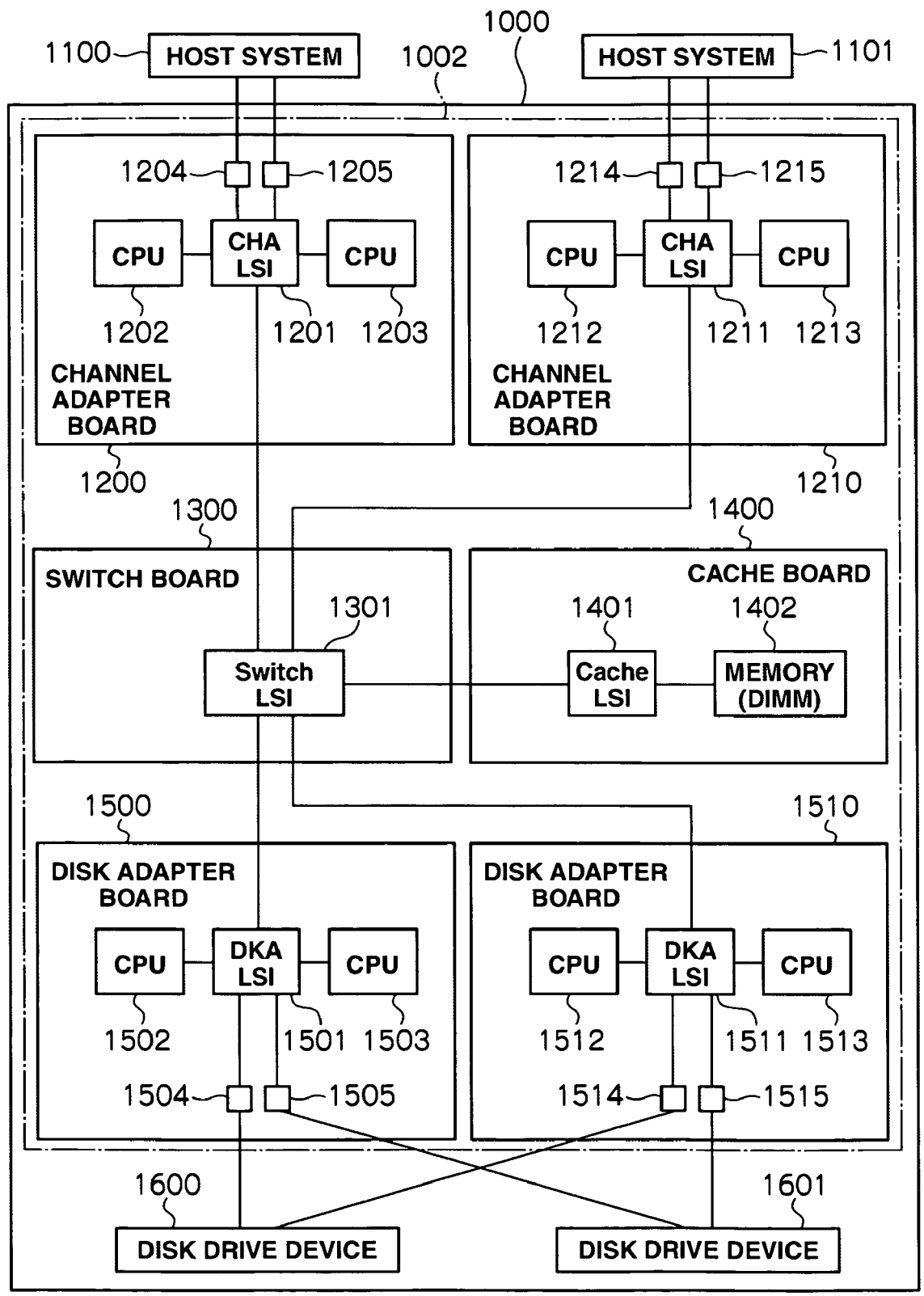
FIG. 25 shows an example of the internal configuration of the storage apparatus, according to embodiment 8, having the first large scale integrated circuit according to embodiment 8 arranged thereon.

A configuration where a built-in ASIC board is arranged in a storage apparatus will be explained below. FIG. 25 shows an example of the internal configuration of a storage apparatus 1000 having a built-in ASIC board 1 arranged therein.

The storage apparatus 1000 is connected to host systems 1100 and 1101. A logical unit 1002 arranged inside the storage apparatus 1000 is also connected to the host systems 1100 and 1101 and to the disk drive devices 1600 and 1601. Note that the disk drive devices 1600 and 1601 are configured from the HDDs arranged in the HDD boxes 1001. The logical unit 1002 is located between the host systems 1100, 1101 and the disk drive devices 1600, 1601 and, for example, writes write data sent from the host system 1100 in the disk drive device 1600 and reads, as requested from the host system 1100, the data stored in the disk drive device 1600. Note that, although embodiment 8 is explained as having the configuration where two host systems (1100, 1101) and two disk drive devices (1600, 1601) are provided, the invention is not limited to this configuration.

In the logical unit 1002, six boards of four types are arranged. They are, channel adapter boards 1200 and 1210, switch board 1300, cache board 1400, and disk adapter boards 1500 and 1510.

The channel adapter board 1200 is in charge of connecting the host system 1100 and the storage apparatus 1000 to each other. It has a channel adapter LSI 1201, CPUs 1202,1203, and protocol chips 1204,1205 arranged therein. The protocol chips 1204 and 1205 connect the host system 1100 and the channel adapter LSI 1201 to each other. The channel adapter LSI 1201 is connected to the CPUs 1202, 1203 as well as to the switch board 1300.

The channel adapter board 1210 is in charge of connecting the host system 1101 and the storage apparatus 1000 to each other. It has a channel adapter LSI 1211, CPUs 1212, 1213, and protocol chips 1214, 1215 arranged therein. The protocol chips 1214, 1215 connect the host system 1101 and the channel adapter LSI 1211 to each other. The channel adapter LSI 1211 is connected to the CPUs 1212 and 1213 as well as to the switch board 1300.

The switch board 1300 is in charge of controlling the data transfer between the channel adapter boards 1200, 1210, cache board 1400, and disk adapter boards 1500, 1510. The switch board 1300 has a switch LSI 1301 arranged therein for controlling the data transfer.

The cache board 1400 is in charge of temporarily storing write data from the host systems 1100, 1101 in the disk drive devices 1600, 1601 as well as read data from the disk drive devices 1600, 1601. It has arranged therein a cache LSI 1401 having a function temporarily storing the write data and read data; and a large capacity memory 1402 for storing data. The cache LSI 1401 is connected to the switch LSI 1301. The memory 1402 is connected to the cache LSI 1401. Note that an example of the memory 1402 is a DIMM (Double Inline Memory Module).

The disk adapter board 1500 is in charge of controlling data write to the disk drive devices 1600, 1601 and data read from the disk drive devices 1600, 1601. It has a disk adapter LSI 1501, CPUs 1502, 1503, and protocol chips 1504, 1505 arranged therein. The protocol chips 1504, 1505 are connected to the disk adapter LSI 1501 and to disk drive devices 1600,1601. The disk adapter LSI 1501 is connected to the CPUs 1502,1503 and to the switch LSI 1501.

The disk adapter board 1510 is in charge of controlling data write to the disk drive devices 1600,1601 and data read from the disk drive devices 1600,1601. It has a disk adapter LSI 1511, CPUs 1512,1513, and protocol chips 1514,1515 arranged therein. The protocol chips 1514,1515 are connected to the disk adapter LSI 1511 and to the disk drive devices 1600, 1601. The disk adapter LSI 1511 is connected to the CPUs 1512,1513 and to the switch LSI 1501.

A built-in ASIC board 1 according to embodiments 1-7 is employed as the channel adapter LSIs 1201, 1211, switch LSI 1301, cache LSI 1401, disk adapter LSIs 1501,1511 on the channel adapter boards 1200, 1210, switch board 1300, cache board 1400, and disk adapter boards 1500,1510 arranged in the storage apparatus 1000.

According to embodiment 8, it is possible to provide a storage apparatus 1000 with enhanced reliability, in which, even when a failure is detected in a logical block during the operation of the channel adapter LSIs 1201, 1211, switch LSI 1301, cache LSI 1401, and disk adapter LSIs 1501, 1511, the storage apparatus 1000 can continue its operation.

Other Embodiments

The above embodiments are merely examples of the invention and are not intended to limit the invention.

For example, although one ASIC 10 and one FPGA 30 are arranged on a board in the above embodiments, it is also possible to arrange more than one ASIC and/or FPGA on the board.

Also, although it is described in the above embodiments that logical blocks are connected to one another via the internal bus 12 in the ASIC 10, the invention may be employed in a configuration using no internal bus 12. Further, although the ASIC 10, CPU 20, and FPGA 30 are arranged on the same board 1 in the above embodiments, they may alternatively be arranged on different boards but connected to one another with connectors or the like. Also, a multi chip module (MCM) where an ASIC 10 and FPGA 30 are arranged on the same package may be adopted.

Moreover, the invention is not limited to the case described in the above embodiments where the invention is applied to a built-in ASIC board 1 that includes: an ASIC 10 including logical blocks 11A-11E; a programmable FPGA 30 connected the ASIC 10 and including a logical block 11F; a memory 40 storing configuration information for achieving the purposes of the logical blocks 11A-11E; and a CPU 10 that, when a failure is detected in any of the logical blocks 11A-11E during the operation of the ASIC 10, writes the configuration information for the faulty logical block stored in the memory to the logical block 11F, and uses the logical block 11F in place of the faulty logical block.

Moreover, the invention is not limited to the case described in the above embodiments where the invention is applied to a storage apparatus 1000, including: channel adapter boards 1200, 1210 having arranged thereon channel adapter LSIs 1201, 1211 for exchanging information with an external host systems 1100, 1101; disk adapter boards 1500, 1510 having arranged thereon disk adapter LSIs 1501, 1511 for exchanging data with external disk drive devices 1600, 1601; a cache board 1400 having arranged thereon cache LSI 1401 for temporarily storing the information exchanged between the host systems 1100, 1101 and the disk drive devices 1600, 1601; and a switch board 1300 having arranged thereon a switch LSI 1301 for controlling the data transfer between the channel adapter boards 1200, 1210, cache board 1400, and disk adapter boards 1500, 1510, wherein, each of the channel adapter LSIs 1201, 1211, disk adapter LSIs 1501, 1511, cache LSI 1401, and switch LSI 1301 arranged on channel adapter boards 1200, 1210, disk adapter boards 1500, 1510, cache board 1400, and switch board 1300, includes: an ASIC 10 including logical blocks 11A-11E; a programmable FPGA 30 connected the ASIC 10 and including a logical block 11F; a memory 40 storing configuration information for achieving the purposes of the logical blocks 11A-11E; and a CPU 10 that, when a failure is detected in any of the logical blocks 11A-11E during the operation of the ASIC 10, writes the configuration information for the faulty logical block stored in the memory to the logical block 11F, and uses the logical block 11F in place of the faulty logical block.

The invention can be widely applied in a semiconductor integrated circuit device and in a storage apparatus having a semiconductor integrated circuit device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A semiconductor integrated circuit device, comprising:
  a first large scale integrated circuit including a plurality of first logical blocks;
  a programmable second large scale integrated circuit connected with the first large scale integrated circuit and including a plurality of second logical blocks;
  a memory storing data for achieving the purposes of the first logical blocks; and
  a control unit that, when an error is detected in any of the first logical blocks during an operation of the first large scale integrated circuit, writes the data for the faulty first logical block stored in the memory to one of the second logical blocks in operating status, in which the control unit continues to operate, and uses the one of the second logical blocks in place of the faulty first logical block in the operating status, in which the control unit continues to operate, wherein the first large scale integrated circuit checks for an error in the first logical blocks, and, if the error is detected, issues an interruption request to the control unit, the control unit receives the interruption request, and obtains error information from a register in the first large scale integrated circuit, and analyzes the error information, the error information including an identifier (ID) of a faulty first logical block as well as content of the error, the control unit, if the faulty first logical block cannot be replaced with the programmable second large scale integrated circuit, sends a normal error handling command to the first large scale integrated circuit for closing a relevant path of the faulty first logical block, the first large scale integrated circuit, if receives the normal error handling command, closes the relevant path of the faulty first logical block, the control unit, if the faulty first logical block can be replaced with the programmable second large scale integrated circuit, finds out which logical block has the error, based on analyzing the error information, and sends an address of the faulty first logical block in a location in the memory and a command for causing the programmable second large scale integrated circuit to read implementation data from the memory, the programmable second large scale integrated circuit, if receives the address of the faulty first logical block in the location in the memory, and the command, reads the implementation data from the address of the location in the memory, and implements functions of the faulty first logical block in the one of the second logical blocks in the programmable second large scale integrated circuit, and reports completion of the implementation, the control unit, if receives the completion of the implementation, issues to the first large scale integrated circuit a command for causing the first large scale integrated circuit to replace the faulty first logical block with the one of the second logical blocks in the programmable second large scale integrated circuit and to switch the relevant path of the faulty first logical block to the one of the second logical blocks in the programmable second large scale integrated circuit, the first large scale integrated circuit, if receives the command for causing to replace and switch, replaces the faulty first logical block with the one of the second logical blocks in the programmable second large scale integrated circuit and switches the relevant path of the faulty first logical block to the one of the second logical blocks in the programmable second large scale integrated circuit, the control unit, after the replacing and the switching, issues a command to the first large scale integrated circuit for causing the first large scale integrated circuit to conduct a self-test, the self-test checks whether the error is a hard error or a soft error, which corrupts data, and the first large scale integrated circuit executes the self-test and, if the error is the soft error, stops using the one of the second logical blocks in the programmable second large scale integrated circuit and adapting using the fault first logical block, and, if the error is the hard error, continues using the one of the second logical blocks in the programmable second large scale integrated circuit.

2. The semiconductor integrated circuit device according to claim 1, wherein:
   in the first large scale integrated circuit, the first logical blocks are connected to one another via an internal bus;
   the first large scale integrated circuit and the programmable second large scale integrated circuit each have an interface circuit for converting internal bus signals to serial interface signals and vice versa; and
   the first large scale integrated circuit and the programmable second large scale integrated circuit are connected to each other via the interface circuits.

3. The semiconductor integrated circuit device according to claim 1, comprising a plurality of first large scale integrated circuits, wherein:
   the programmable second large scale integrated circuit is connected to the first large scale integrated circuits.

4. The semiconductor integrated circuit device according to claim 1, comprising a plurality of the programmable second large scale integrated circuits, wherein
   when two or more errors are detected in the first logical blocks during the operation of the first large scale integrated circuit, the control unit writes the data for the two or more faulty first logical blocks stored in the memory to the second logical blocks in the programmable second large scale integrated circuits respectively.

5. The semiconductor integrated circuit device according to claim 1, comprising a plurality of first large scale integrated circuits and programmable second large scale integrated circuits, wherein
   when two or more errors are detected in the first logical blocks during the operation of the first large scale integrated circuits, the control unit writes the data for the two or more faulty first logical blocks stored in the memory to the second logical blocks in the programmable second large scale integrated circuits, respectively.

6. The semiconductor integrated circuit device according to claim 1, wherein:
   some of the first logical blocks in the first large scale integrated circuit are duplicated; and
   when an inconsistency is detected in the results of the processing performed by the duplicated first logical blocks during the operation of the first large scale integrated circuit, the control unit writes data for the inconsistent duplicated first logical blocks stored in the memory to the second logical blocks respectively, and uses those second logical blocks in place of the inconsistent duplicated first logical blocks.

7. The semiconductor integrated circuit device according to claim 1, wherein:
   the first large scale integrated circuit is an ASIC (Application Specific Integrated Circuit) and the programmable second large scale integrated circuit is a FPGA (Field Programmable Gate Array).

8. A storage apparatus, comprising:
   a plurality of channel adapter boards each having arranged thereon a semiconductor integrated circuit device for exchanging data with an external host computer;
   a plurality of disk adapter boards each having arranged thereon a semiconductor integrated circuit device for exchanging data with a plurality of external disks;
   a cache board having arranged thereon a semiconductor integrated circuit device for temporarily storing the data exchanged between the host computer and the disks; and
   a switch board having arranged thereon a semiconductor integrated circuit device for controlling to transfer data between the channel adapter boards, cache board, and disk adapter boards, wherein,
each of the semiconductor integrated circuit devices arranged on the channel adapter boards, disk adapter boards, cache board, and switch board, respectively, comprises:
a first large scale integrated circuit including a plurality of first logical blocks;
a programmable second large scale integrated circuit connected with the first large scale integrated circuit and including a plurality of second logical blocks;
a memory storing data for achieving the purposes of the first logical blocks; and
a control unit that, when an error is detected in any of the first logical blocks during an operation of the first large scale integrated circuit, writes the data for the faulty first logical block stored in the memory to one of the second logical blocks in operating status, in which the control unit continues to operate, and uses the one of the second logical blocks in place of the faulty first logical block in the operating status, in which the control unit continues to operate, wherein the first large scale integrated circuit checks for an error in the first logical blocks, and, if the error is detected, issues an interruption request to the control unit, the control unit receives the interruption request, and obtains error information from a register in the first large scale integrated circuit, and analyzes the error information, the error information including an identifier (ID) of a faulty first logical block as well as content of the error, the control unit, if the faulty first logical block cannot be replaced with the programmable second large scale integrated circuit, sends a normal error handling command to the first large scale integrated circuit for closing a relevant path of the faulty first logical block, the first large scale integrated circuit, if receives the normal error handling command, closes the relevant path of the faulty first logical block, the control unit, if the faulty first logical block can be replaced with the programmable second large scale integrated circuit, finds out which logical block has the error, based on analyzing the error information, and sends an address of the faulty first logical block in a location in the memory and a command for causing the programmable second large scale integrated circuit to read implementation data from the memory, the programmable second large scale integrated circuit, if receives the address of the faulty first logical block in the location in the memory, and the command, reads the implementation data from the address of the location in the memory, and implements functions of the faulty first logical block in the one of the second logical blocks in the programmable second large scale integrated circuit, and reports completion of the implementation, the control unit, if receives the completion of the implementation, issues to the first large scale integrated circuit a command for causing the first large scale integrated circuit to replace the faulty first logical block with the one of the second logical blocks in the programmable second large scale integrated circuit and to switch the relevant path of the faulty first logical block to the one of the second logical blocks in the programmable second large scale integrated circuit, the first large scale integrated circuit, if receives the command for causing to replace and switch, replaces the faulty first logical block with the one of the second logical blocks in the programmable second large scale integrated circuit and switches the relevant path of the faulty first logical block to the one of the second logical blocks in the programmable second large scale integrated circuit, the control unit, after the replacing and the switching, issues a command to the first large scale integrated circuit for causing the first large scale integrated circuit to conduct a self-test, the self-test checks whether the error is a hard error or a soft error, which corrupts data, and the first large scale integrated circuit executes the self-test and, if the error is the soft error, stops using the one of the second logical blocks in the programmable second large scale integrated circuit and adapting using the fault first logical block, and, if the error is the hard error, continues using the one of the second logical blocks in the programmable second large scale integrated circuit.

9. The storage apparatus according to claim 8, wherein:

in the first large scale integrated circuit, the first logical blocks are connected to one another via an internal bus;

the first large scale integrated circuit and the programmable second large scale integrated circuit each have an interface circuit for converting internal bus signals to serial interface signals and vice versa; and the first large scale integrated circuit and the programmable second large scale integrated circuit are connected to each other via the interface circuits.

10. The storage apparatus according to claim 8, comprising a plurality of first large scale integrated circuits, wherein:

the programmable second large scale integrated circuit is connected to the first large scale integrated circuits.

11. The storage apparatus according to claim 8, comprising a plurality of the programmable second large scale integrated circuits, wherein when two or more errors are detected in the first logical blocks during the operation of the first large scale integrated circuit, the control unit writes the data for the two or more faulty first logical blocks stored in the memory to the second logical blocks in the programmable second large scale integrated circuits respectively.

12. The storage apparatus according to claim 8, comprising a plurality of first large scale integrated circuits and programmable second large scale integrated circuits, wherein when two or more errors are detected in the first logical blocks during the operation of the first large scale integrated circuits, the control unit writes the data for the two or more faulty first logical blocks stored in the memory to the second logical blocks in the programmable second large scale integrated circuits, respectively.

13. The storage apparatus according to claim 8, wherein:

some of the first logical blocks in the first large scale integrated circuit are duplicated; and when an inconsistency is detected in the results of the processing performed by the duplicated first logical blocks during the operation of the first large scale integrated circuit, the control unit writes data for the inconsistent duplicated first logical blocks stored in the memory to the second logical blocks respectively, and uses those second logical blocks in place of the inconsistent duplicated first logical blocks.

14. The storage apparatus according to claim 8, wherein:

the first large scale integrated circuit is an ASIC (Application Specific Integrated Circuit) and the programmable second large scale integrated circuit is a FPGA (Field Programmable Gate Array).

* * * * *